US008949559B2

(12) United States Patent
Tanaka et al.

(10) Patent No.: US 8,949,559 B2
(45) Date of Patent: Feb. 3, 2015

(54) STORAGE SYSTEM AND PERFORMANCE MANAGEMENT METHOD OF STORAGE SYSTEM

(75) Inventors: Toru Tanaka, Sagamihara (JP); Noriko Nakajima, Machida (JP); Takashi Amano, Yokohama (JP); Yasunori Kaneda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 288 days.

(21) Appl. No.: 13/123,996

(22) PCT Filed: Mar. 25, 2011

(86) PCT No.: PCT/JP2011/001796
§ 371 (c)(1),
(2), (4) Date: Apr. 13, 2011

(87) PCT Pub. No.: WO2012/131753
PCT Pub. Date: Oct. 4, 2012

(65) Prior Publication Data
US 2012/0246425 A1 Sep. 27, 2012

(51) Int. Cl.
*G06F 12/00* (2006.01)
*G06F 3/06* (2006.01)

(52) U.S. Cl.
CPC ............ *G06F 3/0611* (2013.01); *G06F 3/0647* (2013.01); *G06F 3/065* (2013.01); *G06F 3/0689* (2013.01); *G06F 3/0623* (2013.01); *G06F 3/0664* (2013.01); *G06F 3/067* (2013.01)
USPC .................... 711/162; 711/170; 711/E12.103

(58) Field of Classification Search
USPC ........................................................ 711/162
See application file for complete search history.

(56) References Cited

U.S. PATENT DOCUMENTS

| 6,857,011 | B2 | 2/2005 | Reinke | |
|---|---|---|---|---|
| 7,191,304 | B1 * | 3/2007 | Cameron et al. | 711/202 |
| 8,375,180 | B2 * | 2/2013 | Chiu et al. | 711/156 |
| 2002/0147862 | A1 | 10/2002 | Traut et al. | |
| 2008/0168228 | A1 * | 7/2008 | Carr et al. | 711/117 |
| 2008/0313641 | A1 * | 12/2008 | Inoue et al. | 718/104 |
| 2010/0011178 | A1 * | 1/2010 | Feathergill | 711/162 |
| 2010/0131733 | A1 * | 5/2010 | Jess | 711/170 |
| 2010/0138620 | A1 * | 6/2010 | Jess | 711/162 |
| 2011/0078398 | A1 * | 3/2011 | Jess | 711/162 |
| 2011/0185120 | A1 * | 7/2011 | Jess | 711/114 |
| 2011/0283075 | A1 * | 11/2011 | Jess et al. | 711/162 |

OTHER PUBLICATIONS

International Search Report for PCT Application No. PCT/JP2011/001796 mailed on Oct. 24, 2011.

\* cited by examiner

*Primary Examiner* — Reginald G. Bragdon
*Assistant Examiner* — Brendan Lillis
(74) *Attorney, Agent, or Firm* — Volpe and Koenig, P.C.

(57) ABSTRACT

It is an object to use a storage region in an efficient manner and maintain a performance of a storage system. A volume group GR11 includes reference volumes 1411, 1413, and 1415 and source volumes 1412, 1414, 1416, and 1417 that derive from the reference volumes. Each of the volumes stores only the difference data from a volume that is a parent thereof. A volume that is a cause of a problem is moved or copied from a pool of the moment 1410 to other pool 1420. A configuration of a volume group is modified.

6 Claims, 23 Drawing Sheets

FIG. 5

Memory (1404)

- Data processing program — 4001
- Storage information management program — 4002
- Storage configuration information table — 4003
- Pair information table — 4004
- Storage performance information table — 4005
- IO number count table — 4006
- Mapping information table — 4007

FIG. 6

Virtual computer configuration information table (2004)

| VM (2004C1) | LU (2004C2) | TARGET IF (2004C3) |
|---|---|---|
| 1010 | 1412 | 1401 |
| 1020 | 1414 | 1401 |
| 1030 | 1416 | 1401 |
| 1040 | 1417 | 1401 |

FIG. 7

Virtual computer performance information table — 2005

| VM (2005C1) | LU (2005C2) | IOPS (2005C3) |
|---|---|---|
| 1010 | 1412 | 125 |
| 1020 | 1414 | 225 |
| 1030 | 1416 | 325 |
| 1040 | 1417 | 925 |

FIG. 8

LU performance information table — 3003

| STORAGE (3003C1) | LU (3003C2) | IOPS (3003C3) |
|---|---|---|
| 1400 | 1411 | 100 |
| 1400 | 1412 | 100 |
| 1400 | 1413 | 500 |
| 1400 | 1414 | 100 |
| 1400 | 1415 | 200 |
| 1400 | 1416 | 100 |
| 1400 | 1417 | 100 |

FIG. 9

Storage configuration information table (4003)

| STORAGE (4003C1) | POOL (4003C2) | LU (4003C3) | SIZE (4003C4) | IF (4003C5) |
|---|---|---|---|---|
| 1400 | 1410 | 1411 | 300GB | 1402 |
| 1400 | 1410 | 1412 | | 1402 |
| 1400 | 1410 | 1413 | | 1402 |
| 1400 | 1410 | 1414 | | 1402 |
| 1400 | 1410 | 1415 | | 1402 |
| 1400 | 1410 | 1416 | | 1402 |
| 1400 | 1410 | 1417 | | 1402 |

FIG. 10

Pair information table (4004)

| STORAGE (4004C1) | PVOL (4004C2) | SVOL (4004C3) | POOL (4004C4) |
|---|---|---|---|
| 1400 | 1411 | 1412 | 1410 |
| 1400 | 1411 | 1413 | 1410 |
| 1400 | 1413 | 1414 | 1410 |
| 1400 | 1413 | 1415 | 1410 |
| 1400 | 1415 | 1416 | 1410 |
| 1400 | 1415 | 1417 | 1410 |

FIG. 11

Storage performance information table — 4005

| TIME 4005C1 | STORAGE 4005C2 | LU 4005C3 | SOURCE_LU 4005C4 | IOPS 4005C5 |
|---|---|---|---|---|
| 2010/11/01-10:00 | 1400 | 1411 | 1412 | 25 |
| 2010/11/01-10:00 | 1400 | 1411 | 1414 | 25 |
| 2010/11/01-10:00 | 1400 | 1411 | 1416 | 25 |
| 2010/11/01-10:00 | 1400 | 1411 | 1417 | 25 |
| 2010/11/01-10:00 | 1400 | 1412 | - | 100 |
| 2010/11/01-10:00 | 1400 | 1413 | 1414 | 100 |
| 2010/11/01-10:00 | 1400 | 1413 | 1415 | 100 |
| 2010/11/01-10:00 | 1400 | 1413 | 1417 | 300 |
| 2010/11/01-10:00 | 1400 | 1414 | - | 100 |
| 2010/11/01-10:00 | 1400 | 1415 | 1416 | 100 |
| 2010/11/01-10:00 | 1400 | 1415 | 1417 | 100 |
| 2010/11/01-10:00 | 1400 | 1416 | - | 10 |
| 2010/11/01-10:00 | 1400 | 1417 | - | 500 |
| : | : | : | : | : |

FIG. 12

| | IO number count table | | 4006 |
|---|---|---|---|
| 4006C1 | 4006C2 | 4006C3 | 4006C4 |
| STORAGE | LU | SOURCE_LU | IO number |
| 1400 | 1411 | 1412 | 25 |
| 1400 | 1411 | 1414 | 25 |
| 1400 | 1411 | 1416 | 25 |
| 1400 | 1411 | 1417 | 25 |
| 1400 | 1412 | - | 100 |
| 1400 | 1413 | 1414 | 100 |
| 1400 | 1413 | 1415 | 100 |
| 1400 | 1413 | 1417 | 300 |
| 1400 | 1414 | - | 100 |
| 1400 | 1415 | 1416 | 100 |
| 1400 | 1415 | 1417 | 100 |
| 1400 | 1416 | - | 10 |
| 1400 | 1417 | - | 500 |
| : | : | : | : |

FIG. 13

| | Mapping information table | | | |
|---|---|---|---|---|
| 4007C1 | 4007C2 | 4007C3 | 4007C4 | |
| STORAGE | LU | LOGICAL ADDRESS | PHYSICAL ADDRESS | |
| 1400 | 1411 | L1101 | P1101 | ← A1 |
| | | L1102 | P1102 | |
| | | L1103 | P1103 | |
| | | ... | ... | |
| | | L11xx | P11xx | |
| 1400 | 1413 | L1301 | L1101 | ← A2 |
| | | L1302 | L1102 | |
| | | L1303 | P1303 | ← A3 |
| | | ... | ... | |
| | | L13xx | L11xx | |
| 1400 | 1415 | L1501 | P1401 | |
| | | L1502 | L1102 | |
| | | L1503 | L1303 | |
| | | ... | ... | |
| | | L15xx | L11xx | |

4007

STORAGE SYSTEM AND PERFORMANCE MANAGEMENT METHOD OF STORAGE SYSTEM

TECHNICAL FIELD

The present invention relates to a storage system and a performance management method of a storage system.

BACKGROUND ART

In recent years, in accordance with an improvement of a performance of a computer, it has been possible that a plurality of virtual computers (hereafter referred to as a virtual machine) can be operated on a physical computer. The virtual machine activates an operating system that has been installed to a virtual storage device (hereafter referred to as a virtual hard disk drive) and executes a wide variety of processing.

On the other hand, a technique for acquiring a snapshot that can be written on a file system is publicly known (see U.S. Pat. No. 6,857,011). The snapshot means a static image of data at a certain point of time.

In accordance with the technique of a snapshot that can be written, the difference data is generated by a write to a snapshot. The difference data is stored into a storage region other than a storage region in which a snapshot has been created. A stored destination of the difference data is changed to the other storage region.

SUMMARY OF INVENTION

For instance, an IO (Input/output) (also referred to as an IO load) request from a virtual machine is concentrated to the specific difference data in some cases depending on a type of an application program or a usage of an application program by a user. In the case in which an IO load from a virtual machine is concentrated to the specific difference data, there is a possibility that a performance of a disk that has stored the difference data becomes a bottleneck of a system.

Consequently, it is thought that a sequence of all data that configures a snapshot that can be written is copied to other storage region in order to disperse a load. In this case however, it is necessary that a copy of a sequence of all data is created, whereby it takes a long time to complete a copy processing and a used amount of a disk is increased unfortunately.

The present invention was made in consideration of such problems, and an object of the present invention is to provide a storage system and a performance management method of a storage system in which a storage region can be used in an efficient manner while a performance is maintained. Other objects of the present invention will be clarified by the explanation of the embodiments described later.

In order to solve the above problems, a storage system in accordance with an aspect of the present invention is a storage system that is provided with a storage apparatus that is used for a computer wherein (1) the storage apparatus comprising (1A) at least one first logical volume configured to store the reference data; (1B) at least one second logical volume configured to store the difference data from the first logical volume and configured to be allocated to the computer; (1C) at least one volume group that includes a pair of the first logical volume and the second logical volume; and (1D) an access request processing part configured to process an access request from the computer to the second logical volume, wherein the access request processing part accesses and processes the difference data that is included in the second logical volume in the case in which an access destination of the access request is the difference data and the access request processing part accesses and processes the reference data that is included in the first logical volume that forms a pair with the second logical volume in the case in which an access destination of the access request is the reference data, and the storage system comprising (2) a load measuring part configured to manage the access request from the computer to the second logical volume by classifying the second logical volume and the first logical volume that is included in the volume group that includes the second logical volume according to the access destination of the access request and configured to measure a load of the second logical volume and the first logical volume; and (3) a cause identifying part configured to identify a cause volume that is a cause of a specific problem that is specified in advance among the first logical volume and the second logical volume according to the measurement result of the load measuring part.

The storage system can be further comprised of a mapping management part configured to map an address space of the first logical volume and an address space of the second logical volume and configured to manage a connection relationship between logical volumes that configure the volume group. The access request processing part processes an access request from the computer by using the mapping management part, and the load measuring part classifies and manages the access request into the second logical volume and the first logical volume by using the mapping management part.

The first logical volume can include a base volume and at least one reference volume that is created as a snapshot volume of the base volume and that is configured to store the difference data from the base volume. The second logical volume can be created as a snapshot volume of the base volume and/or the reference volume.

The storage system can be further comprised of a plan creation part configured to create a configuration improvement plan for suppressing the specific problem for the configuration of the volume group that includes the cause volume.

The present invention can also be figured out as a performance management method of a storage system. Moreover, at least part of the present invention can also be configured as a computer program. A plurality of features of the present invention that are described in the embodiments can also be combined with freedom.

BRIEF DESCRIPTION OF DRAWINGS

FIG. 5 is an illustrative view showing the contents that have been stored into a memory of a storage apparatus.

FIG. 6 is a view showing a table for managing a configuration of a virtual computer.

FIG. 7 is a view showing a table for managing a performance of a virtual computer.

FIG. 8 is a view showing a table for identifying a cause of a performance problem.

FIG. 9 is a view showing a table for managing a configuration of a storage apparatus.

FIG. 10 is a view showing a table for managing a pair of LUs.

FIG. 11 is a view showing a table for managing a performance of a storage apparatus.

FIG. 12 is a view showing a table for counting an IO number.

FIG. 13 is a view showing a table for managing the mapping information.

DESCRIPTION OF EMBODIMENTS

An embodiment (example) of the present invention will be described below in detail with reference to the drawings. As described in the following, a child volume is created from a parent volume by using a snapshot, and the storage contents of the child volume can be updated. The child volume manages the difference data that has occurred between the child volume and the parent volume. A cascade connection between the parent volume and the child volume is carried out, and a volume group is configured. In the case in which data that has been stored into the parent volume is used, the parent volume is accessed for a processing. In the case in which the difference data that has occurred in the child volume is used, the child volume is accessed for a processing.

In the case in which a volume that is a cause of a performance problem is detected, the volume that is the cause is moved or copied to a pool other than a pool that includes the volume at the moment. A resource of a pool can be a storage region of a RAID group that is configured by a plurality of hard disk drives (HDD) or can be a storage region that is configured by a single HDD. Different pools are configured by different resources. A cascade connection between a volume that has been moved or copied to other pool and a volume that remains in the original pool is carried out. By this step, a configuration of a volume group can be improved. A response performance of a storage system can be maintained without wasting a storage region.

A first embodiment of the present invention will be described below in detail with reference to FIGS. 1 to 18. The present embodiment is carried out in the case in which a marginal performance of a storage apparatus 1400 that is used by a computer 1000 is calculated for instance.

Figure 1:
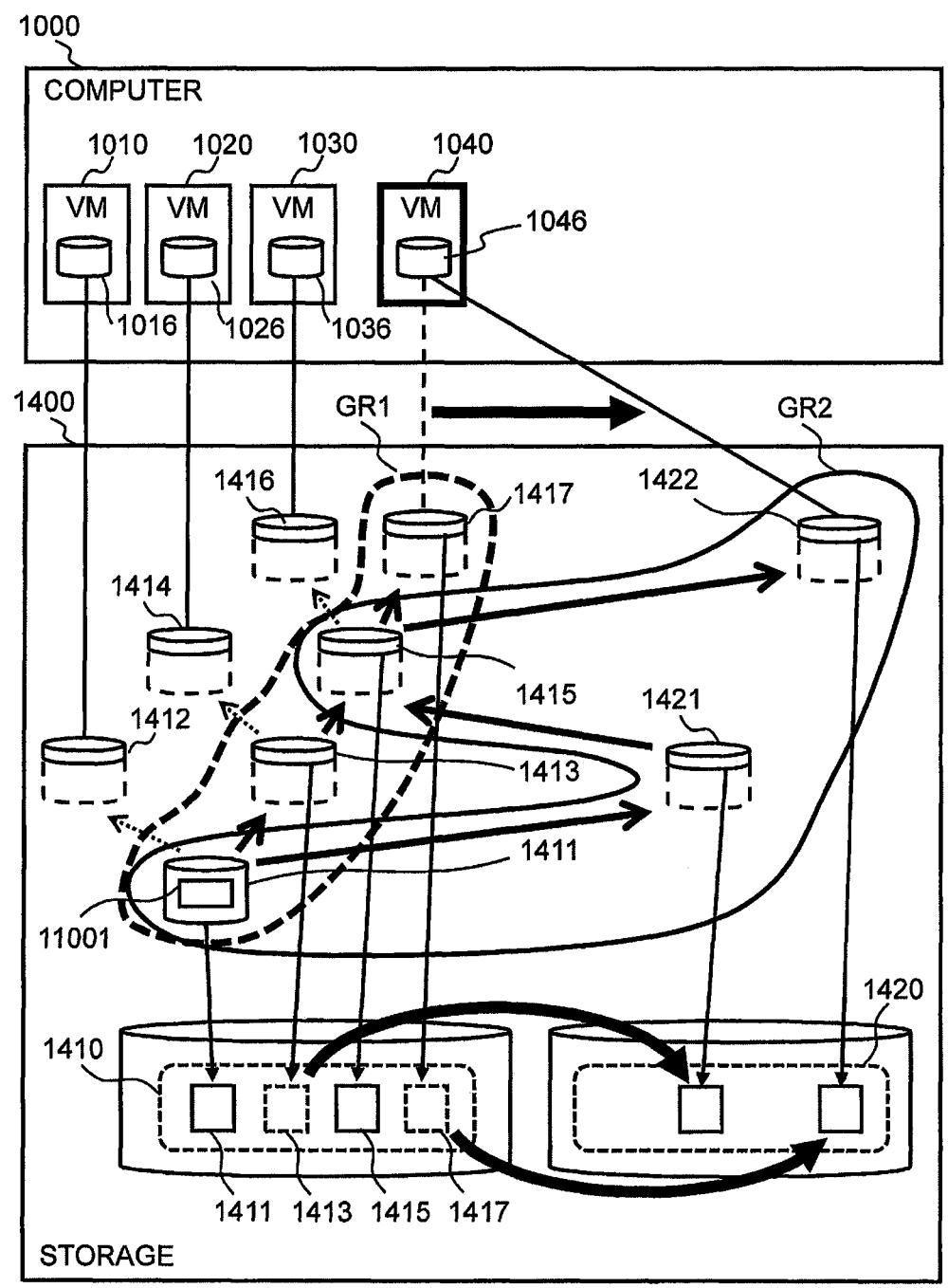
FIG. 1 is an illustrative view schematically showing a general outline in accordance with an embodiment of the present invention.

FIG. 1 is an illustrative view schematically showing a general outline in accordance with an embodiment of the present invention. A storage apparatus 1400 is coupled to a computer 1000 and a management computer 1100 (see FIG. 2) via a communication network such as an IP-SAN (Internet Protocol-Storage Area Network) and/or an FC-SAN (Fibre Channel-Storage Area Network) for instance. The detailed configurations of the computer 1000, the management computer 1100, and the storage apparatus 1400 will be described later.

The computer 1000 is provided with virtual computers 1010, 1020, 1030, and 1040. The virtual computers can also be called a virtual machine (VM). The virtual computers 1010, 1020, 1030, and 1040 are provided with virtual storage regions 1016, 1026, 1036, and 1046, respectively.

The storage apparatus 1400 is provided with an LU 1412, an LU 1414, an LU 1416, and an LU 1417 as an LU (Logical Unit) that can be mounted by the computer. An LU that can be mounted by the computer is called a source LU in some cases. A source LU is corresponded to a second logical volume.

The LU 1412 is mounted to the virtual computer 1010. The LU 1414 is mounted to the virtual computer 1020. The LU 1416 is mounted to the virtual computer 1030. The LU 1417 is mounted to the virtual computer 1040. The other LU 1411, LU 1413, and LU 1415 are LUs that are a reference. The computer cannot mount a reference LU. A reference LU is corresponded to a first logical volume. A virtual hard disk file 11001 that is included in the LU 1411 has been stored into the LU 1412. The computer 1000 can mount the LU 1412, and the virtual computer can also mount the virtual hard disk file 11001.

The computer recognizes the LU 1412, the LU 1414, the LU 1416, and the LU 1417 that can be mounted similarly to a normal LU. In other words, from the computer, it looks like that all data of each of the LUs are stored into the LU 1412, the LU 1414, the LU 1416, and the LU 1417. However, the source LUs 1412, 1414, 1416, and 1417 are virtual LUs in which only the difference data from the parent LU has been stored in a practical sense.

Immediately after a child LU is created from a parent LU by using a snapshot technique, the storage contents of the parent LU are equivalent to those of the child LU. In the case in which the child LU is allocated to the computer and data is written to the child LU, the difference data occurs between the child LU and the parent LU, and only the difference data is stored into the child LU. Consequently, the child LU can also be called a difference LU.

The LU 1411 is a base LU that is an original source of a sequence of difference LUs 1412, 1413, 1414, 1415, 1416, and 1417. The base LU 1411 stores data that is an original source. The LU 1412 is a difference LU that is created based on the base LU as a parent. Only the difference data from the base LU 1411 is stored into the LU 1412.

The LU 1414 is a difference LU that is created based on the LU 1413 as a parent LU. Only the difference data from the parent LU 1413 is stored into the LU 1414. The parent LU 1413 is a difference LU that is created based on the base LU 1411. Only the difference data from the base LU 1411 is stored into the LU 1413.

The LU 1415 is a difference LU that is created based on the LU 1413 as a parent LU. Only the difference data from the parent LU 1413 is stored into the LU 1415. Moreover, two difference LUs 1416 and 1417 are created based on the LU 1415 as a parent LU. Only the difference data from the parent LU 1415 is stored into the difference LUs 1416 and 1417.

The difference data is stored into a storage region that is called a pool 1410 in the storage apparatus 1400. The following describes the case in which the virtual computer 1020 writes data to the LU 1414. In the case in which a region of a write destination already exists as the difference data, data is overwritten to the region. In the case in which a region of a write destination does not exist as the difference data, a region for, storing the difference data is newly created in the pool 1410 and the difference data is written to the region. In other words, data that is different from data that has been stored into a parent LU is stored into the pool 1410. Moreover, it is not necessary that the LU 1411 is stored into the pool 1410. The LU 1411 can also be stored into a location other than the pool 1410.

In FIG. 1, it looks like that only LUs 1411, 1413, 1415, and 1417 store data in the pool 1410. However, other LUs 1412, 1414, and 1416 store the difference data in the same pool or other pools in a practical sense.

FIG. 1 shows a plurality of data systems that are separated from the common base LU 1411. A first system reaches a difference LU 1412 from the base LU 1411. A second system reaches a difference LU 1414 from the base LU 1411 via a difference LU 1413. A third system reaches a difference LU 1416 from the base LU 1411 via a difference LU 1413 and a difference LU 1415. A fourth system reaches a difference LU 1417 from the base volume 1411 via a difference LU 1413 and a difference LU 1415.

The fourth system will be described furthermore in the following. The virtual machine 1040 mounts the LU 1417 that is a source LU. An entity of the LU 1417 is a volume group GR1 that is configured by including the base LU 1411 and the difference LUs 1413, 1415, and 1417. The base LU 1411 includes a virtual hard disk drive 11001. The LU 1413 stores the difference data of the LU1411. The LU 1415 stores the difference data of the LU1413. The LU 1417 stores the difference data of the LU1415.

An example will be mentioned for instance. The data of an OS (Operating System) of the original source is stored into the base LU 1411. In the figure, a code of each of the volumes is added to the unique data of each of the volumes that are stored into a pool as a matter of practical convenience. For instance, data of the base volume 1411 is indicated by a code 1411. The difference data that is unique to the LU1413 is indicated by a code 1413.

In the case in which a first modification program is applied to an OS of the original source due to a bug fix for instance, a first reference LU 1413 that has been created by a snapshot from the base LU 1411 is prepared, and the first modification program is applied to the first reference LU 1413. At this time, the first modification program is stored into the pool 1410.

A source LU 1414 is created by using the first reference LU 1413 as a parent. Immediately after the LU 1414 is created by a snapshot from the LU 1413, the contents of the both LUs viewed from the computer are corresponded to each other. In the case in which the source LU 1414 is allocated to the virtual computer 1020 and an application program is stored, the difference data occurs between the first reference LU 1413 that is a parent and the source LU 1414 that is a child. The application program that is the difference data (not shown in the figure as a matter of practical convenience) is stored into the pool 1410. Alternatively, the difference data can also be stored into the other pool.

In the case in which it is necessary that a second modification program is applied to the OS, a second reference LU 1415 is created by a snapshot by using the first reference LU 1413 as a parent, and the first modification program is applied to the second reference LU 1415. At this time, the second modification program is stored into the pool 1410.

Two source LUs 1416 and 1417 are created by using the second reference LU 1415 as a parent. The source LU 1416 is allocated to the virtual computer 1030 and stores an application program. The source LU 1417 is allocated to the virtual computer 1040 and stores the same or different application program. The application program that is applied to each of the source LUs 1416 and 1417 is stored into the pool 1410. However, the state in which the application program of the source LU 1416 is stored into the pool 1410 is omitted in the figure.

In the case in which the LUs 1413 and 1417 have a high load, a user can be informed of the state, or a configuration improvement processing S19 that is described later in FIG. 20 can be executed. The entities of the LUs 1413 and 1417 having a high load are moved to the inside of other pool 1420 and an LU 1421 and an LU 1422 are created by the configuration improvement processing. The LU 1413 in the movement source pool 1410 is moved to the movement destination pool 1420 and becomes the LU 1421. Similarly, the LU 1417 in the movement source pool 1410 is moved to the movement destination pool 1420 and becomes the LU 1422.

By the LU 1421 and the LU 1422 after the movement, a new volume group GR2 is created. The new volume group GR2 is configured by the base LU 1411, the first reference LU 1421, the second reference LU 1415, and the source LU 1422. After the volume group GR2 is configured, the VM 1040 switches an LU to be used from the LU 1417 to the LU 1422.

By this configuration, an IO request in which the LU1421 (the LU 1413 before the movement) and the LU 1422 (the LU 1417 before the movement) are targets is processed by using a storage apparatus that configures other pool 1420. Since an IO load can be shared processed by one pool 1410 and the other pool 1420, a response performance of a storage system can be suppressed from being deteriorated. Moreover, since only the high load LU 1413 and LU 1417 are moved to other pool 1420, a storage region of a storage system can be prevented from being used more than is necessary.

In the example of FIG. 1, an LU is moved to the other pool 1420 according to a load state, and a configuration of a data system (a volume group configuration) is modified. Consequently, while a response performance of a storage system is maintained, a used amount of a storage region can be reduced.

Figure 2:
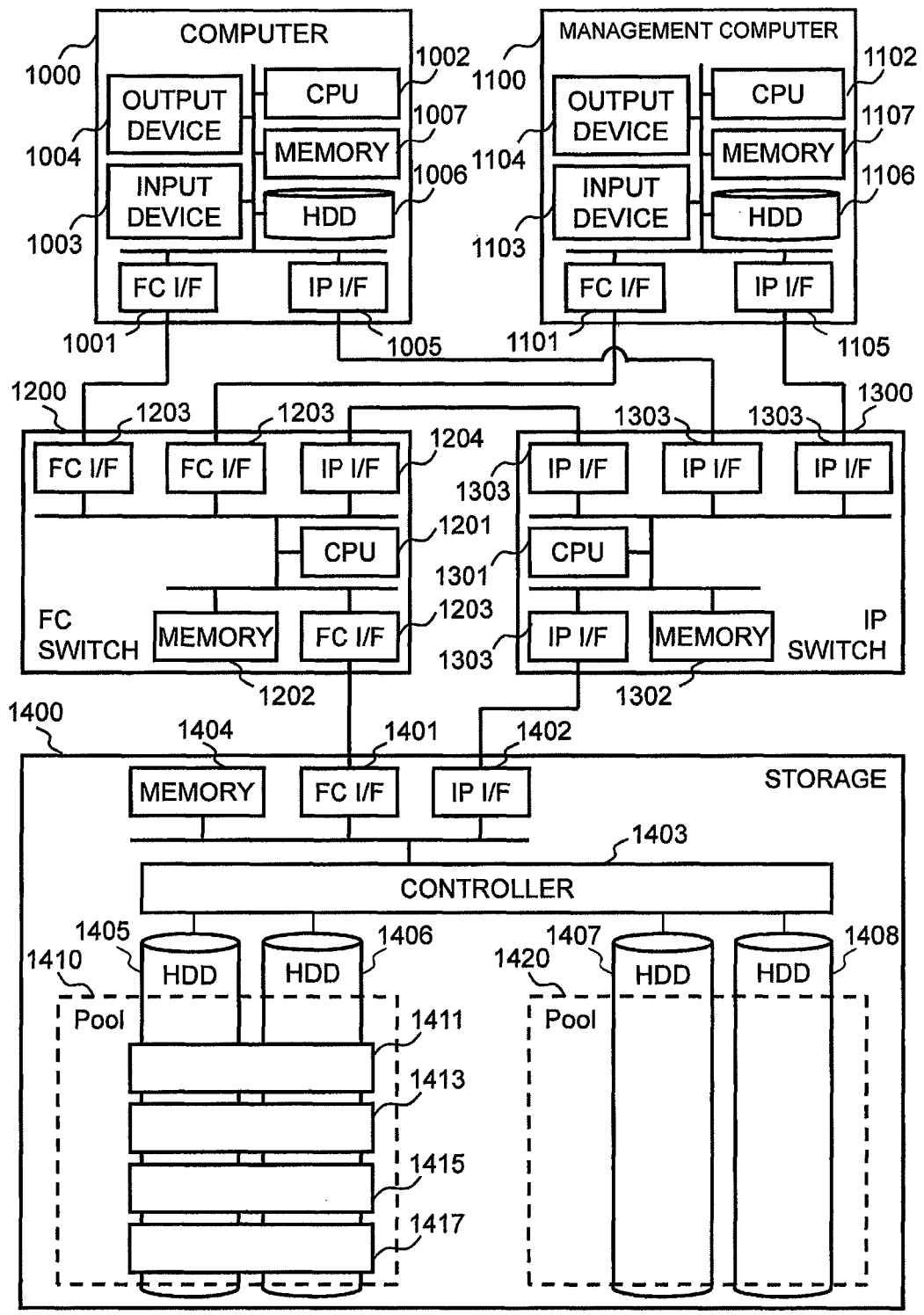
FIG. 2 is an illustrative view showing a hardware configuration of a computer system that includes a storage system.

FIG. 2 is an illustrative view showing an entire configuration of a computer system that includes a storage system. This system is provided with at least one computer 1000, at least one management computer 1100, and at least one storage apparatus 1400 for instance. Moreover, this system can be provided with an FC switch 1200 and an IP switch 1300.

The computer 1000 executes an input or an output to the storage apparatus 1400. The computer 1000 includes an FC I/F 1001, a CPU 1002, an input device 1003, an output device 1004, an IP I/F 1005, a storage apparatus 1006, and a memory 1007 for instance.

The FC I/F 1001 is a circuit configured to exchange data with the storage apparatus 1400 in accordance with an FC protocol. An IO request from the computer 1000 is transmitted to the storage apparatus 1400 via the FC I/F 1001. The IP I/F 1005 is a circuit configured to exchange management data with the management computer 1100.

The CPU (Central Processing Unit) 1002 implements a predetermined function by executing a computer program. The CPU 1002 controls an operation of the entire of the computer 1000. The storage apparatus 1006 stores a computer program, a table, and user data for instance. The memory 1007 stores a computer program and a table that are read from the storage apparatus 1006. Although the storage apparatus and the memory are separated from each other in FIG. 2, the storage apparatus and the memory can also be formed in an integrated manner.

The input device 1003 can be configured by including a keyboard switch, a pointing device, a touch panel, a microphone, and a camera for instance. A user can provide the information to the computer 1000 by using the input device 1003. The output device 1004 can be configured by including a display, a printer, and a voice synthesizer for instance. A user can take the information from the computer 1000 by using the output device 1004.

The management computer 1100 is configured to manage the computer 1000 and the storage apparatus 1400. The management computer 1100 includes an FC I/F 1101, a CPU 1102, an input device 1103, an output device 1104, an IP I/F 1105, a storage apparatus 1106, and a memory 1107 for instance.

The FC I/F 1101 is a circuit configured to transmit and receive the input/output data and control data with the storage apparatus 1400. The IP I/F 1105 is a circuit configured to transmit and receive the management data with the computer 1000 and the storage apparatus 1400.

The CPU 1102 controls the entire of the management computer 1100 by executing a computer program. The storage apparatus 1106 stores a computer program, a table, and user data for instance. The memory 1107 stores a computer program and a table that are used by the CPU 1102.

The input device 1103 is corresponded to the input device 1003 of the computer 1000. The output device 1104 is corresponded to the output device 1004 of the computer 1000. Consequently, the detailed descriptions of the input device 1103 and the output device 1104 are omitted.

The management computer 1100 can be configured by one computer or can be configured by a plurality of computers. Moreover, a function of the management computer 1100 can be implemented in any one of other devices 1000, 1200, 1300, and 1400.

The FC switch 1200 is an apparatus configured to control a transfer of data (such as IO data) that is transmitted or received between the computer 1000 and the storage apparatus 1400. The FC switch 1200 includes a CPU 1201, a memory 1202, a plurality of FC I/Fs 1203, and an IP I/F 1204 for instance.

The CPU 1201 controls the entire of the FC switch by executing a computer program. The memory 1202 stores a computer program, data and so on. The FC I/F 1203 is a circuit configured to execute a data transfer based on an FC protocol. The FC I/F 1203 is coupled to the FC I/F 1001 of the computer 1000, the FC I/F 1101 of the management computer 1100, and the FC I/F 1401 of the storage apparatus 1400.

The IP switch 1300 is an apparatus configured to control a transfer of the management data that is transmitted from the management computer 1100 to the computer 1000 and the storage apparatus 1400. The IP switch 1300 is provided with a CPU 1301, a memory 1302, a plurality of IP I/Fs 1303 for instance.

The CPU 1301 controls the entire of the IP switch by executing a computer program. The memory 1302 stores a computer program, data and so on. The IP I/F 1303 is a circuit configured to transmit and receive the management data.

The storage apparatus 1400 is a node for processing input/output data from the computer 1000. The storage apparatus 1400 is provided with an FC I/F 1401, an IP I/F 1402, a controller 1403, a memory 1404, storage apparatuses 1405, 1406, 1407, and 1408, pools 1410 and 1420, and LUs 1411, 1413, 1415, and 1417 for instance.

The FC I/F 1401 is a circuit configured to transmit and receive the IO data with the computer 1000 via the FC switch 1200. The IP I/F 1402 is a circuit configured to transmit and receive the management data with the management computer 1100 via the IP switch 1300.

The controller 1403 implements a predetermined function by executing a computer program that has been stored into the memory 1404. The controller 1403 controls an operation of the entire of the storage apparatus. The controller 1403 is provided with an interface for communicating with each of storage apparatuses 1405, 1406, 1407, and 1408.

The storage apparatuses 1405, 1406, 1407, and 1408 store the user data. As a storage apparatus, a wide variety of devices that can read and write data such as a hard disk device, a semiconductor memory device, an optical disk device, and a magneto optical disk device can be utilized for instance.

In the case in which a hard disk device is used, an FC (Fibre Channel) disk, a SCSI (Small Computer System Interface) disk, a SATA disk, an ATA (AT Attachment) disk, and a SAS (Serial Attached SCSI) disk can be used for instance. Moreover, a wide variety of storage apparatuses such as a flash memory, a FeRAM (Ferroelectric Random Access Memory), an MRAM (Magnetoresistive Random Access Memory), a phase change memory (Ovonic Unified Memory), and a RRAM (Resistance RAM) can also be used for instance.

Although four storage apparatuses 1405, 1406, 1407, and 1408 are shown in FIG. 2 as a matter of practical convenience, more than four storage apparatuses can also be disposed in the storage apparatus 1400. The collection of physical storage regions that are included in a plurality of storage apparatuses enables the RAID group to be configured. By storage regions in the RAID group, the LU 1411, the LU 1413, the LU 1415, and the LU 1417 that are logical storage apparatuses can be created in a predetermined size or an arbitrary size. The user data can be stored into each of the LUs.

The pools 1410 and 1420 are user data storage regions. The pools 1410 and 1420 store data of the base LU 1411 and each of the difference LUs 1413, 1415, and 1417.

The present embodiment is described while focusing attention on the volume group GR1 shown in FIG. 1. Consequently, only the base LU 1411 and each of the difference LUs 1413, 1415, and 1417 are shown in FIG. 2. Data of other LUs 1412, 1414, and 1416 are also stored into the storage apparatus 1400 in a practical sense.

Figure 3:
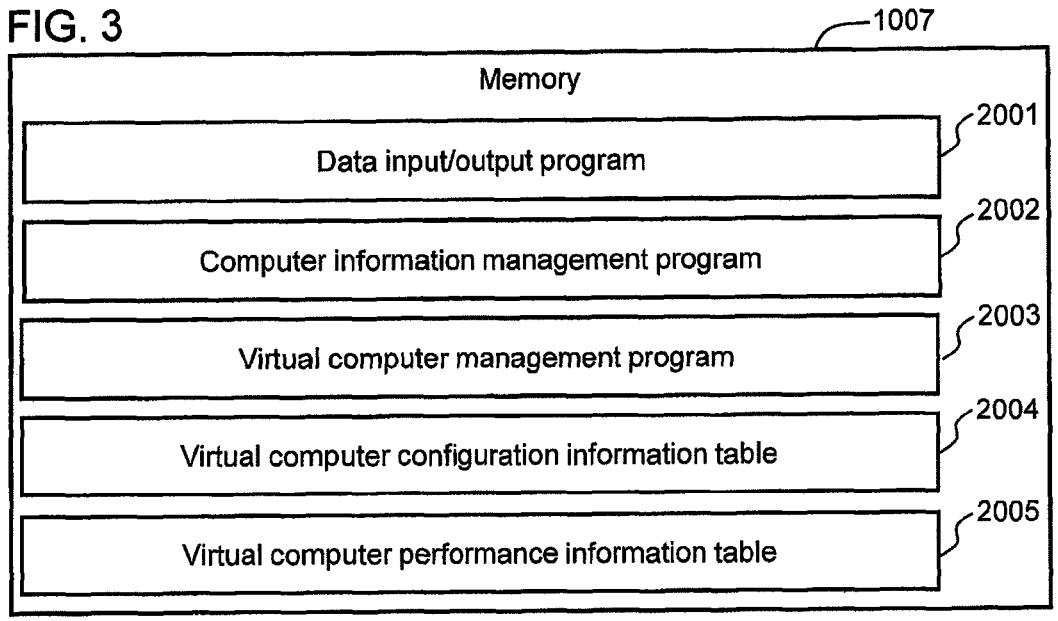
FIG. 3 is an illustrative view showing the contents that have been stored into a memory of a computer.

FIG. 3 is an illustrative view showing a memory configuration of the computer 1000. The computer 1000 reads the predetermined computer programs 2001, 2002, and 2003 and the predetermined tables 2004 and 2005 to a memory 1007 at the time of startup.

The data input/output program 2001 is a computer program configured to input or output data to an LU that is included in the storage apparatus 1400. The computer configuration management program 2002 is a computer program configured to manage the configuration information of the computer 1000. The virtual computer management program 2003 is a computer program configured to operate a virtual computer on the computer 1000.

The virtual computer configuration information table 2004 is a table configured to manage the configuration information of the virtual computer. The virtual computer performance information table 2005 is a table configured to manage the performance information of the virtual computer.

The virtual computer is a virtual computer that is created by software configured to manage the virtual computer. For the virtual computer, an OS (Operating System) and an application program are operated similarly to a physical computer. Consequently, the virtual computer manages the configuration information and the performance information similarly to a physical computer.

In the present embodiment, the virtual computer configuration information table 2004 and the virtual computer performance information table 2005 are read to a memory 1007 of the computer 1000. As substitute for this configuration, the virtual computer configuration information table 2004 and the virtual computer performance information table 2005 can also be on a dedicated memory region that is used by the virtual computer.

Figure 4:
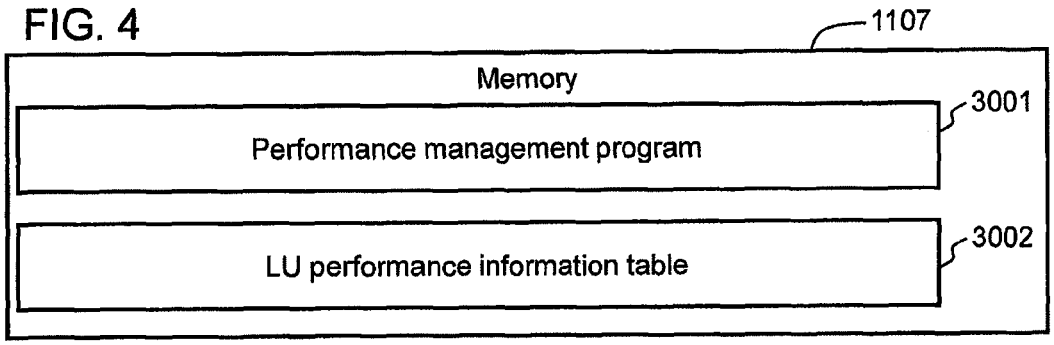
FIG. 4 is an illustrative view showing the contents that have been stored into a memory of a management computer.

FIG. 4 is an illustrative view showing the configuration of a memory of a management computer 1100. The management computer 1100 reads the predetermined computer program 3001 and the predetermined table 3002 to a memory 1107 at the time of startup.

The performance management program 3001 is a computer program configured to manage a performance of the storage apparatus 1400. The LU performance information table 3002 is a table configured to manage the information that indicates a cause of a performance problem of the storage apparatus 1400.

FIG. 5 is an illustrative view showing the configuration of a memory of the storage apparatus 1400. The storage apparatus 1400 reads the predetermined computer programs 4001 and 4001 and the predetermined tables 4003, 4004, 4005, and 4006 to a memory 1404 at the time of startup.

The data processing program 4001 is a computer program configured to process an IO request from the computer 1000. The storage information management program 4002 is a computer program configured to manage the configuration information and the performance information of the storage apparatus 1400.

The storage configuration information table 4003 is a table configured to manage the configuration information of the storage apparatus 1400. The pair information table 4004 is a table configured to manage the pair information that indicates a pair relationship between LUs. The storage performance information table 4005 is a table configured to manage the performance information of the storage apparatus 1400. The IO number count table 4006 is a table configured to record the IO number that has been counted. The mapping information table 4007 is a table configured to manage the correspondence relationship between a logical address space of an LU and a physical address space of a pool.

FIG. 6 is a view showing the configuration of the virtual computer configuration information table 2004. The virtual computer configuration information table 2004 is provided with a VM column 2004C1, an LU column 2004C2, and a target I/F column 2004C3 for instance.

The VM column 2004C1 stores the information for identifying each of the virtual computers. The LU column 2004C2 stores the information for identifying an LU that is used by each of the virtual computers. The target I/F column 2004C3 stores the information for identifying a target I/F to which an LU that is used by each of the virtual computers is coupled. By using the virtual computer configuration information table 2004, it is possible to know an LU to which each of the virtual computers is coupled and a target I/F that is used by each of the virtual computers for coupling. In the following descriptions, an ID, the identification information, an identifier, and a name can be displaced with each other.

FIG. 7 is a view showing the configuration of the virtual computer performance information table 2005. The virtual computer performance information table 2005 is provided with a VM column 2005C1, an LU column 2005C2, and an TOPS column 2005C3 for instance.

The VM column 2005C1 stores the information for identifying each of the virtual computers. The LU column 2005C2 stores the information for identifying an LU that is used by each of the virtual computers. The IOPS column 2005C3 stores an IOPS (Input Output per second) that indicates a frequency in which a virtual computer inputs or outputs an LU per unit time (that is, a performance load of an LU). By using the virtual computer performance information table 2005, it is possible to know a load state of each of the LUs that are used by each of the virtual computers.

FIG. 8 is a view showing the configuration of the LU performance information table 3003. The LU performance information table 3003 is provided with a storage column 3003C1, an LU column 3003C2, and an TOPS column 3003C3 for instance.

The storage column 3003C1 stores the information for identifying a storage apparatus. The LU column 3003C2 stores the information for identifying an LU in a storage apparatus. The IOPS column 3003C3 stores a value of an IOPS that indicates a performance load for each LU. By using the LU performance information table 3003, it is possible to know an LU of which a load is increased and a storage apparatus that is provided with the LU.

FIG. 9 is a view showing the configuration of the storage configuration information table 4003. The storage configuration information table 4003 is provided with a storage column 4003C1, a pool column 4003C2, an LU column 4003C3, a size column 4003C4, and an I/F column 4003C5 for instance.

The storage column 4003C1 stores the information for identifying a storage apparatus. The pool column 4003C2 stores the information for identifying a pool in a storage apparatus. The LU column 4003C3 stores the information for identifying an LU in a storage apparatus. The size column 4003C4 stores a size of an LU. The I/F column 4003C5 stores the information for specifying a management I/F to which an LU is coupled. By using the storage configuration information table 4003, it is possible to know a size of an LU that is included in the storage apparatus and others.

FIG. 10 is a view showing the configuration of the pair information table 4004. The pair information table 4004 is provided with a storage column 4004C1, a PVOL column 4004C2, a SVOL column 4004C3, and a pool column 4004C4 for instance.

The storage column 4004C1 stores the information for identifying a storage apparatus. The PVOL column 4004C2 stores the information for identifying an LU (a primary volume) that is a parent LU of the LU pair. The SVOL column 4004C3 stores the information for identifying an LU (a secondary volume) that is a child LU of the LU pair. The pool column 4004C4 stores the information for identifying a pool that is a storage destination of data. By using the pair information table 4004, it is possible to know a configuration of each pair.

As described in FIG. 1, a pair is configured by a plurality of LUs in the present embodiment. One LU of the pair is a parent LU that holds data that is a source. The other LU of the pair is a child LU (a difference LU) that derives from the parent LU. Immediately after a child LU is created from a parent LU, the storage content of the parent LU is equivalent to that of the child LU. In the case in which the storage content of the child LU is updated, the difference data occurs between the storage content of the parent LU and the storage content of the child LU. The difference data is stored into a pool. Writing to the child LU does not affect the storage content of the parent LU. The difference data occurs only in the child LU, and the storage content of the parent LU is not altered. In the case of a normal copy pair, the storage contents between volumes that configure a pair are made to be corresponded to each other by a resync or a restore. On the other hand, the child LU can be updated regardless of the parent LU in the present embodiment.

Consequently, in the case in which the data that has been stored into the parent LU is used, the parent LU can be accessed in the storage system. By this configuration, data can be prevented from being stored in a redundant manner, and a storage region of a pool can be used in an efficient manner.

FIG. 11 is a view showing the configuration of the storage performance information table 4005. The storage performance information table 4005 is provided with a time column 4005C1, a storage column 4005C2, an LU column 4005C3, a source LU column 4005C4, and an IOPS 4005C5 for instance.

The time column 4005C1 stores the information that indicates the date and time when the performance information is acquired. The storage column 4005C2 stores the information for identifying a storage apparatus. The LU column 4005C3 stores the information for identifying an LU that is a parent LU. The source LU column 4005C4 stores the information for identifying an LU that is a source LU that is mounted to the computer. The source LU derives from an LU that is specified by the LU column 4005C3, and the source LU is an issuance target of an IO request from the computer. The IOPS column 4005C5 is an amount (IOPS) per a unit time (1 second) of an IO request in which an LU is target. By using the storage performance information table 4005, it is possible to know the load of a storage apparatus and an LU.

FIG. 12 is a view showing the configuration of the IO number count table 4006. The IO number count table 4006 is a table configured to count the number of IO per the predetermined time, which is required for calculating a value of the IOPS column of the storage performance information table 4005. A storage column 4006C1, an LU column 4006C2, and a source LU column 4006C3 are corresponded to the storage column 4005C2, the LU column 4005C3, and the source LU column 4005C4 of the storage performance information table 4005, respectively. The IO number column 4006C4 stores the number of IO that has been issued in the predetermined time. The number of IO can be counted on a periodic basis or can be counted at a time that is specified by a user. The IOPS is calculated by using the unit time and the number of IO that has been counted.

FIG. 13 is a view showing the configuration of the mapping information table 4007. The mapping information table 4007 is provided with a storage column 4007C1, an LU column 4007C2, a logical address column 4007C3, and a physical address column 4007C4 for instance.

The storage column 4007C1 stores the information for identifying a storage apparatus. The LU column 4007C2 stores the information for identifying an LU. The logical address column 4007C3 stores a logical address of a target LU that is specified by the LU column 4007C2. The physical address column 4007C4 stores an address in which data that has been stored in a logical address that is specified by the logical address column 4007C3 is stored as a practical matter.

The following describes more specifically. As shown by an arrow A1 for instance, data that exists in a logical address (L1101) of an LU (1411) is stored into a physical address (P1101) in a pool in a practical sense.

As shown by an arrow A2 for instance, data that exists in a logical address (L1301) of an LU (1413) is stored into a logical address (L1101) of an LU (1411) that is a parent LU.

As described above, data that exists in a logical address (L1101) is stored into a physical address (P1101) in a pool in a practical sense.

As shown by an arrow A3 for instance, in the case in which data is written to a logical address (L1303) of an LU (1413), the data becomes the difference data from the parent LU (1411). The difference data is stored into a physical address (P1303) in a pool. By using the mapping information table 4007, it is possible to know the correspondence relationship between a logical address space of an LU and a physical address space of a pool.

Figure 14:
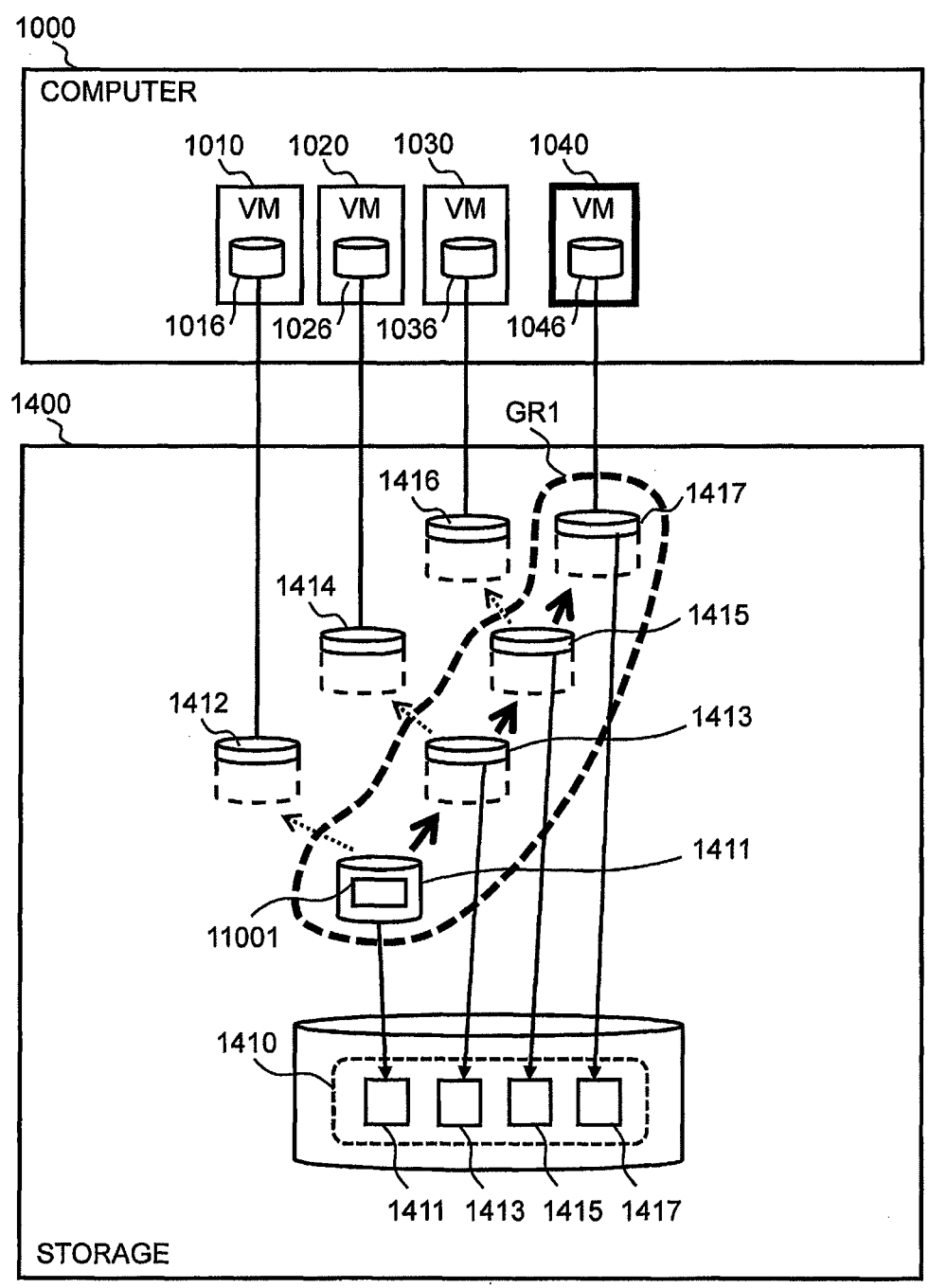
FIG. 14 is a schematic view showing a configuration of a volume group.

FIG. 14 is a schematic view showing a logical configuration of a computer and a storage apparatus. As described in FIG. 1, a plurality of virtual computers 1010, 1020, 1030, and 1040 are operated on the computer 1000. Each of the virtual computers is provided with virtual storage regions 1016, 1026, 1036, and 1046 that are called a virtual hard disk drive. The virtual hard disk drive is managed as a file on a file system of the computer. The computer 1000 stores a file of a virtual hard disk drive on the file system of the LUs 1412, 1414, 1416, and 1417 that have been mounted.

Focusing attention on the storage apparatus 1400, a plurality of child LUs 1412 and 1413 is created based on one base LU 1411 as a parent LU. One child LU 1412 is used by the virtual computer 1010.

A plurality of child LUs 1414 and 1415 is created based on the other child LU 1413 as a new parent LU. Viewed from the base LU 1411 that is an LU of an original source, the plurality of child LUs 1414 and 1415 is a grandchild LU. One child LU 1414 is used by the virtual computer 1020.

A plurality of child LUs 1416 and 1417 is created based on the other child LU 1415 as a further new parent LU. Viewed from the base LU 1411, the plurality of child LUs 1416 and 1417 is a great grandchild LU. One child LU 1416 is used by the virtual computer 1030. The other child LU 1417 is used by the virtual computer 1040.

Immediately after a child LU is created, the storage content of the child LU is equivalent to that of the parent LU. In the case in which the virtual computer writes data to the child LU, the difference data occurs between the storage content of the child LU and the storage content of the parent LU. The difference data is stored into a pool 1410.

Figure 15:
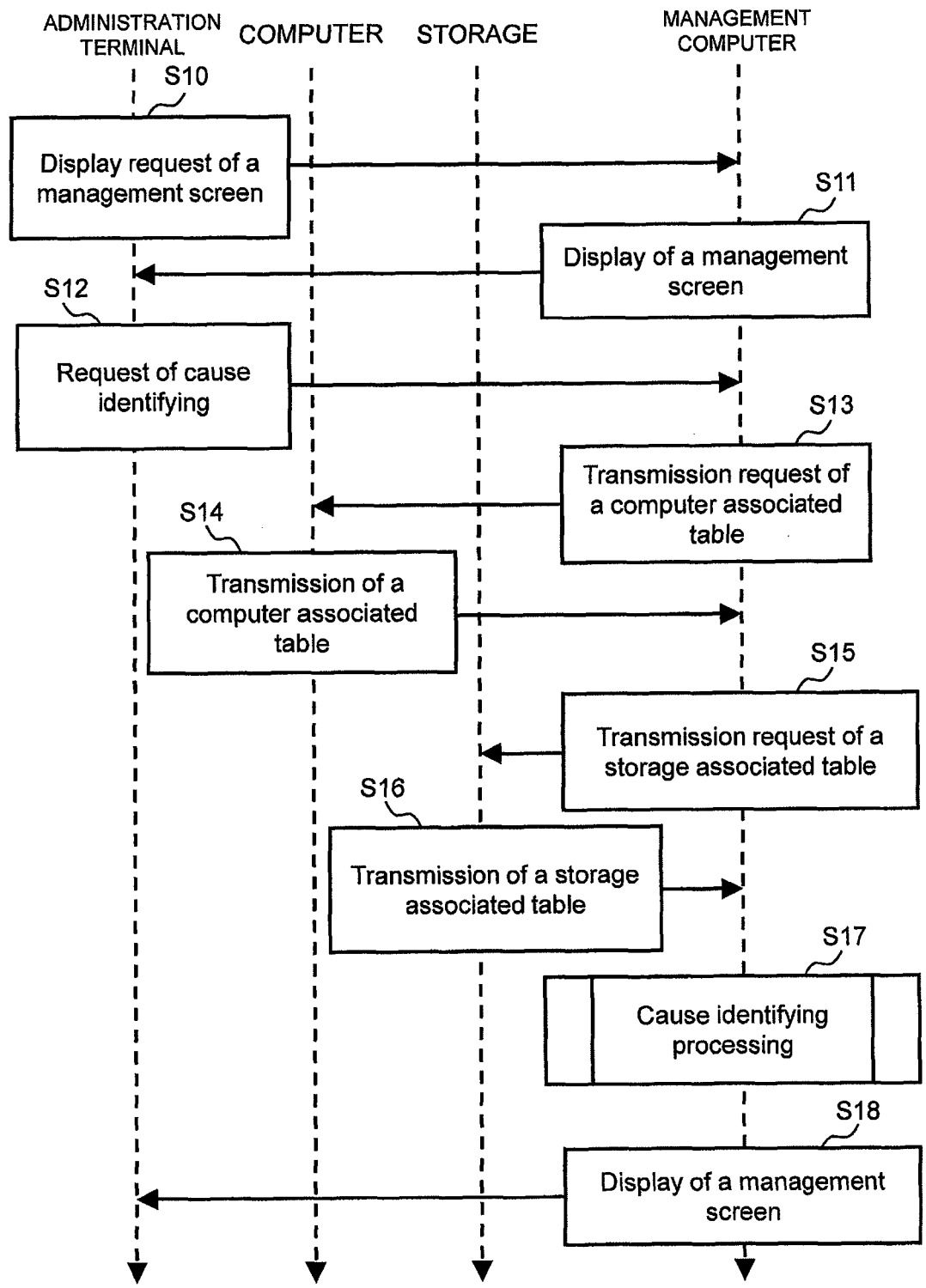
FIG. 15 is a flowchart showing an entire operation for managing a performance of a storage system.

FIG. 15 is a flowchart showing an entire operation for managing a performance of a storage system. In the following descriptions, a step is abbreviated to "S".

Figure 18:
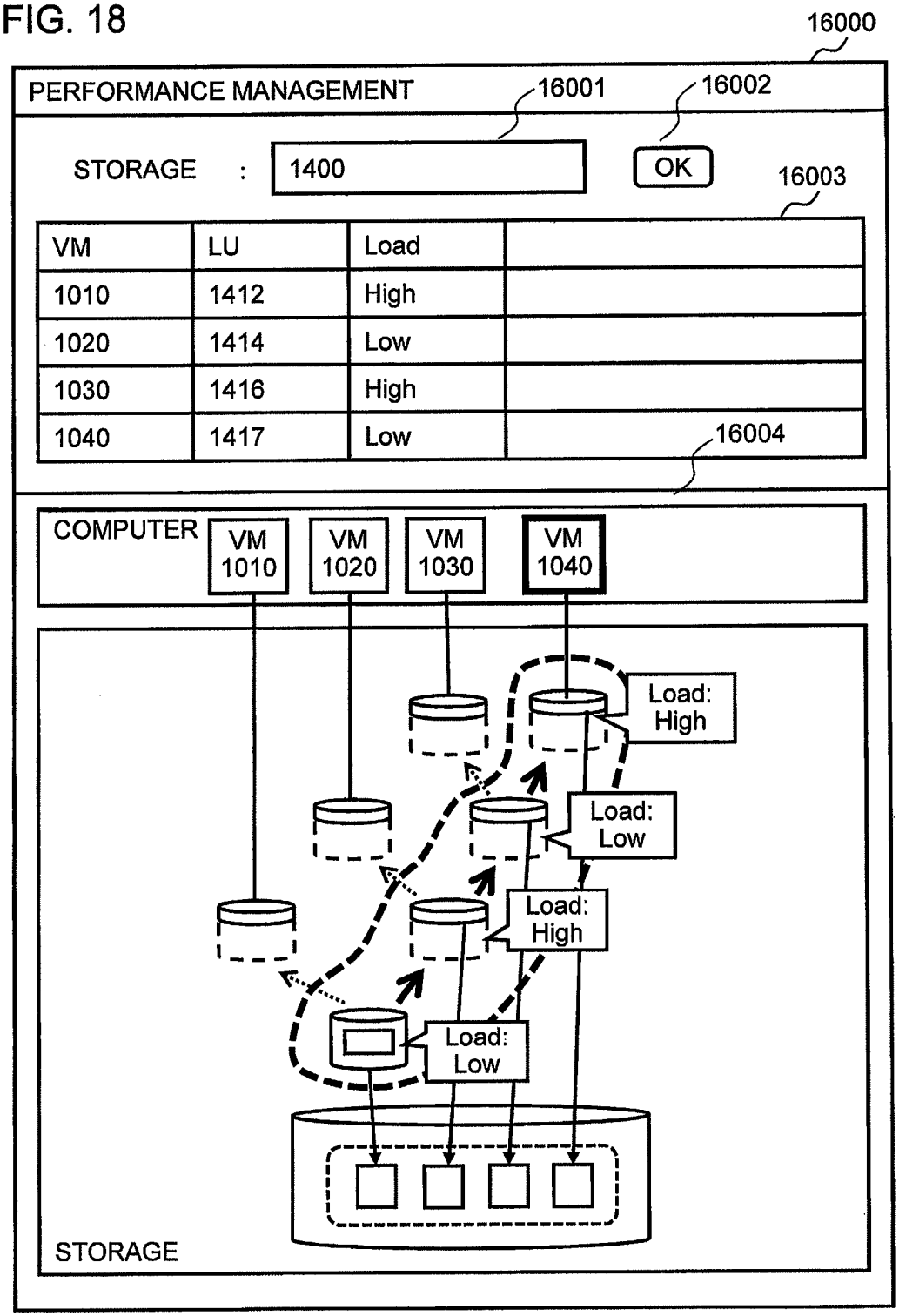
FIG. 18 is a view showing an example of a screen for managing a performance.

A user such as a system administrator transmits a display request of a performance management screen to the management computer 1100 via an administration terminal (not shown) (S10). The performance management program 3001 of the management computer 1100 that has received the display request transmits a performance management screen 16000 that is shown in FIG. 18 to an administration terminal that is used by the user (S11). The screen 16000 configured to manage a performance will be described later. The user can access the management computer 1100 through an administration terminal such as a personal computer, a mobile phone, and a personal digital assistance, and can transmit and receive the information. The user can also operate the management computer 1100 without using an administration terminal.

The user requests identifying of a cause via the performance management screen 16000 (S12). The identifying of a cause means identifying of an LU in which a load is increasing.

In the case in which the performance management program 3001 receives the request of cause identifying, the performance management program 3001 transmits a transmission request of a computer associated table to the computer 1000

(S13). A computer information management program 2002 of the computer 1000 that has received the transmission request transmits the virtual computer configuration information table 2004 and the virtual computer performance information table 2005 to the management computer 1100 (S14).

The performance management program 3001 transmits a transmission request of a storage associated table to the storage apparatus 1400 (S15). A storage information management program 4002 of the storage apparatus 1400 that has received the transmission request transmits the storage configuration information table 4003, the pair information table 4004, and the storage performance information table 4005 to the management computer 1100 (S16).

The performance management program 3001 of the management computer 1100 executes a cause identifying processing described later (S17), transmits the execution result to the administration terminal of the user, and makes the execution result to be displayed on the performance management screen 16000 (S18).

As described above, taking the opportunity of receiving the transmission request from the management computer 1100, the computer 1000 and the storage apparatus 1400 can transmits a predetermined table to the management computer 1100. As substitute for this, a predetermined table can also be transmitted to the management computer 1100 at the timing when a predetermined table is updated.

In the case in which the configuration of the storage apparatus 1400 is modified for instance, the storage configuration information table 4003 is transmitted from the storage apparatus 1400 to the management computer 1100. In the case in which the configuration of the virtual computer is modified for instance, the virtual computer configuration information table 2004 is transmitted from the computer 1000 to the management computer 1100. The performance information (load information) can be transmitted to the management computer 1100 on a regular basis or on an irregular basis.

Figure 16:
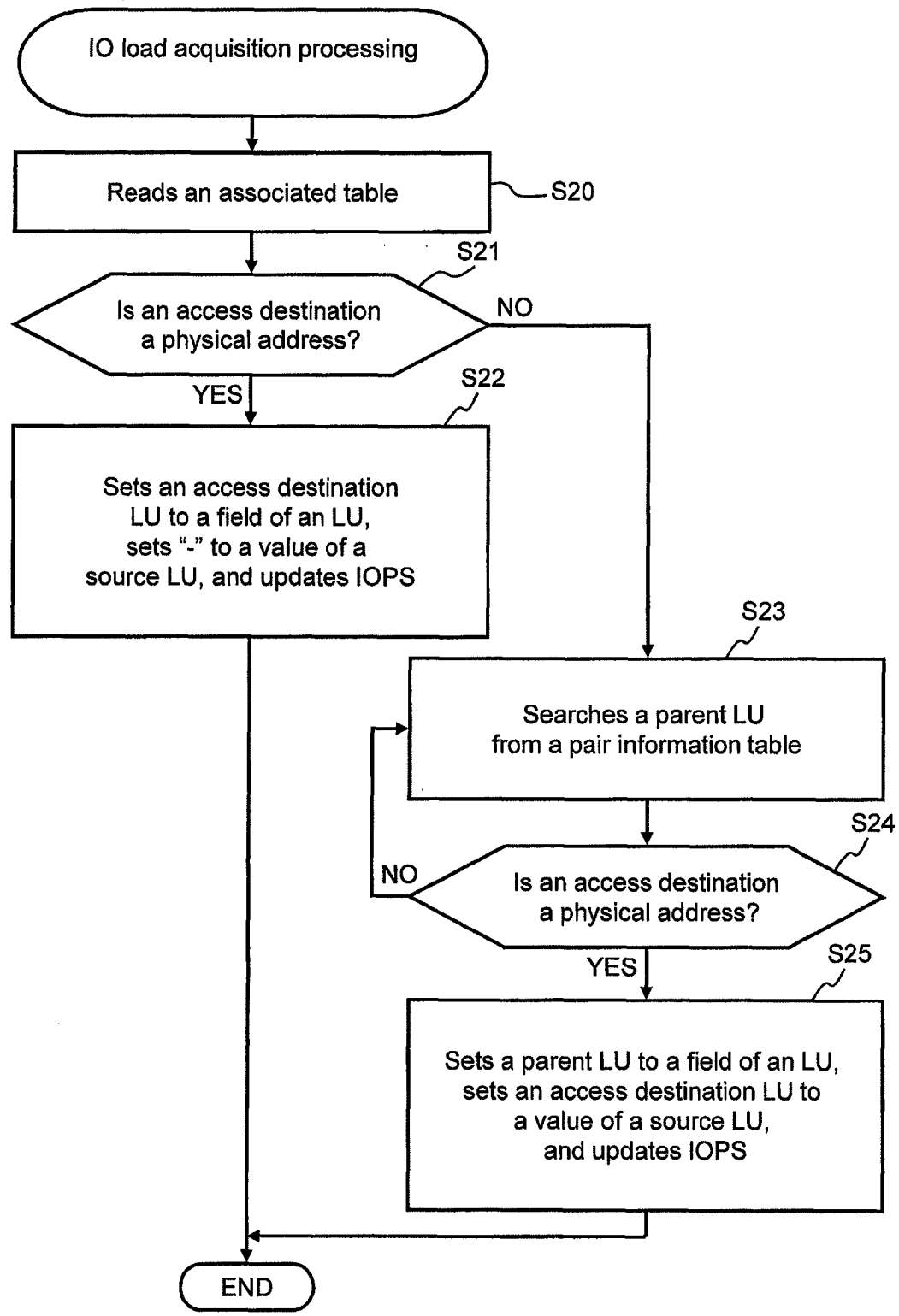
FIG. 16 is a flowchart showing a processing for acquiring an IO load as an example of a load measuring part.

With reference to FIG. 16, a processing for acquiring an IO load will be described in the following. The IO load acquisition processing is for counting the IO number even when an IO request is issued from the computer and for calculating an IOPS at the predetermined timing for instance.

The storage information management program 4002 of the storage apparatus 1400 reads the IO number count table 4006 and the mapping information table 4007 (S20). The performance management program 3001 judges whether or not an access destination address of the virtual computer is a physical address (S21).

In the case in which an access destination of the virtual computer is a physical address (S21: YES), the storage information management program 4002 writes an identifier of an LU of an access destination of the virtual computer to an LU column 4006C2 of the IO number count table 4006 (S22). Moreover, the storage information management program 4002 sets "-" to a source LU column 4006C3 of the IO number count table 4006 (S22). Furthermore, the storage information management program 4002 increase a value of the IO number column 4006C4 by 1 for every IO number (S22). The storage information management program 4002 clears a value of the IO number column 4006C4 to zero when an IOPS is calculated, restarts counting, and continues recording of a result of the count. By this configuration, the IO number in a predetermined time can be recorded.

In the case in which an access destination of the virtual computer is not a physical address (S21: NO), the storage information management program 4002 searches a parent. LU of an access destination LU by using the pair information table 4004 (S23). The performance management program 3001 judges whether or not an access destination address to a parent LU is a physical address (S24). In other words, the storage information management program 4002 judges whether or not a storage destination of data that has been requested from the virtual computer is a physical address of the parent LU.

In the case in which an access destination address to a parent LU is a physical address (S24: YES), the performance management program 3001 writes an identifier of a parent LU to an LU column 4005C3 (S25). Moreover, the storage information management program 4002 writes an identifier of an LU that has been accessed by the virtual computer to the source LU column 4005C4 (S25). Furthermore, the storage information management program 4002 increase a value of the IOPS column 4005C5 by 1 for every IO number (S25).

In the case in which an access destination address to a parent LU is not a physical address (S24: NO), the storage information management program 4002 returns to the S23 and searches a parent LU that is a parent of the LU (S23). The storage information management program 4002 traces back the system of an LU (for instance, a group GR1 of FIG. 13) until a physical address that has stored data that has been requested by the virtual computer is found.

An example in the case in which the virtual computer 1040 shown in FIG. 14 accesses data of the LU 1417 will be described in the following. In the case in which an access destination of the virtual computer 1040 is the difference data of the LU 1417, the difference data has been stored into the pool 1410. In other words, an access destination address is a physical address.

On the other hand, in the case in which an access destination of the virtual computer 1040 is not the difference data of the LU 1417, the LU 1415 that is a parent LU of the LU 1417 is searched. In the case in which an access destination of the virtual computer 1040 is the difference data of the LU 1415, the difference data has been stored into the pool 1410. Consequently, a physical address of data that is requested by the virtual computer 1040 is detected.

On the other hand, in the case in which an access destination of the virtual computer 1040 is not the difference data of the LU 1415, the LU 1413 that is a parent LU of the LU 1415 is searched. Similarly to the above, in the case in which an access destination of the virtual computer 1040 is the difference data of the LU 1413, the difference data has been stored into the pool 1410. Consequently, a physical address of data that is requested by the virtual computer 1040 is detected.

In the case in which an access destination of the virtual computer 1040 is not the difference data of the LU 1413, the base LU 1411 that is a parent LU of the LU 1413 is searched. The base LU 1411 is an original source LU that is a start of a system of an LU pair. All data of the base LU 1411 have been stored into the pool 1410. Consequently, in the case in which an access destination is traced back to the base LU 1411, a physical address of data that is requested by the virtual computer 1040 can be identified without any fail.

As described above, for an access to the source LU 1417 that has been mounted to the virtual computer 1040 by using the virtual computer 1040, a system of an LU pair is traced back until a physical address that has stored the access target data as a practical matter is found.

In the next place, the storage information management program 4002 calculates an IOPS at a predetermined timing based on the IO number that has been stored into the IO number count table 4006 and stores the calculated IOPS into the IOPS 4005C5 of the storage performance information table 4005. The time column 4005C1 of the storage performance information table 4005 stores the information that indicates the date and time when the IOPS is calculated.

Figure 17:
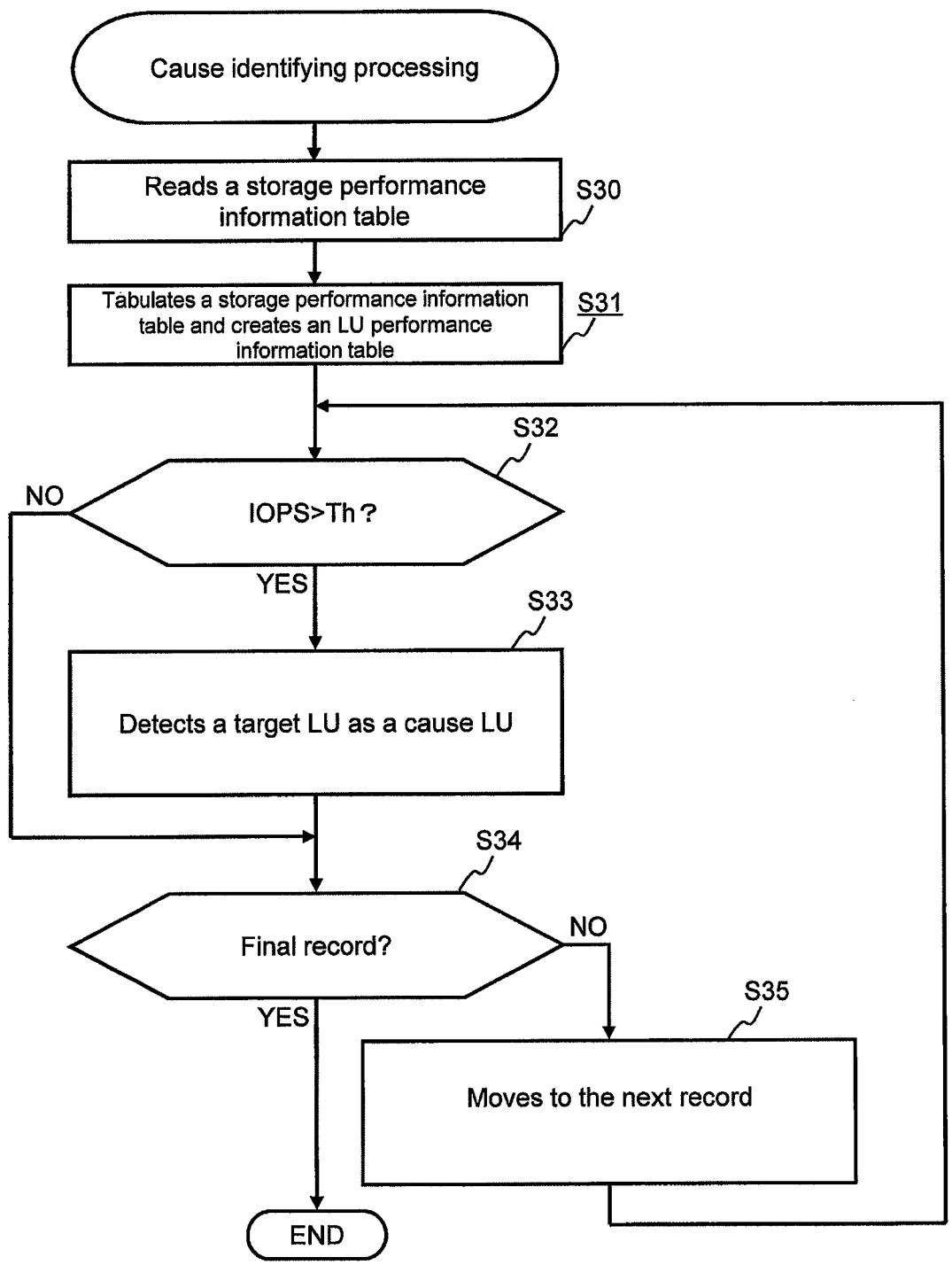
FIG. 17 is a flowchart showing a processing for identifying a cause as an example of a cause identifying part.

With reference to FIG. 17, a cause identifying processing for identifying an LU in which a load is increasing will be described in the following. The cause identifying processing is corresponded to a step that is indicated by S17 in FIG. 15.

The performance management program 3001 reads the storage performance information table 4005 (S30). The performance management program 3001 tabulates the storage performance information table 4005 in an LU unit and stores the results that have been tabulated into the LU performance information table 3003 (S31).

In the next place, the following steps will be processed in a record unit of the LU performance information table 3003. The performance management program 3001 judges whether or not a value that has been stored into the IOPS column 3003C3 exceeds a predetermined threshold value Th (S32).

In the case in which a value of the TOPS exceeds the threshold value Th (S32: YES), an LU that is described in the LU column 3003C2 is detected as a cause LU (S33). In the case in which a value of the IOPS is equal to or less than the threshold value Th (S32: NO), the S33 is skipped.

The performance management program 3001 judges whether or not the final record of the storage performance information table 4005 has been processed (S34). In the case in which the final record of the storage performance information table 4005 has not been processed (S34: NO), that is, an unprocessed record remains, the performance management program 3001 moves to the next record (S35) and returns to the S32. In the case in which the processing of the final record is completed (S34: YES), the present processing is terminated.

For the present embodiment that is configured as described above, an LU in which a performance problem occurs can be identified, whereby the convenience of a user can be improved. In the present embodiment, for a base LU that includes data that is used by a plurality of computers 1000 and for a system (a volume group) of a sequence of LU pairs that include each LU that derives from the base LU, an LU in which a problem occurs can be identified and the problem can be visualized.

With reference to FIG. 18, a configuration of the performance management screen 16000 will be described in the following. The performance management screen 16000 is provided with a storage identifier input part 16001, an OK button 16002, a cause identifying table 16003, and a configuration display part 16004 for instance.

In the storage identifier input part 16001, the information configured to identify the storage apparatus 1400 that is a management target of a performance (a storage identifier) is input. The OK button 16002 is operated by a user in the case in which an execution of a performance management processing is instructed.

The cause identifying table 16003 displays the execution results of a performance management processing in a table format. In the display of the cause identifying table 16003, a virtual computer identifier ("VM" in FIG. 18), an LU identifier, and a load state can be corresponded to each other based on the virtual computer performance information table 2005 for instance.

For all the virtual computers that use an LU that is included in the storage apparatus 1400 that is specified by the storage identifier input part 16001, an LU identifier configured to identify an LU to which the virtual computer has been mounted and a load state are displayed. The load state can be displayed by "Low" or "High" for instance. In the case in which an TOPS is less than a predetermined threshold value, "Low" is displayed. In the case in which an IOPS is larger than a predetermined threshold value, "High" is displayed.

The configuration display part 16004 carries out a graphical display of a relationship between each of the virtual computers and each of the LUs and a pair configuration of each of the LUs. Moreover, the configuration display part 16004 displays a load state of an LU that is used by a virtual computer that has been selected (a virtual computer 1040 in FIG. 18). For instance, "High" is displayed for an LU that has been specified as a cause LU by the cause identifying processing, and "Low" is displayed for other LUs.

A user can easily identify an LU in which a performance load is high by viewing the performance management screen 16000. Consequently, a user can decide an LU of which performance is to be improved in order to resolve a performance bottleneck. By this configuration, a user can implement a countermeasure for resolving a performance problem.

For instance, a performance problem can be resolved by switching a storage apparatus that configures a pool that stores data of an LU of a high load from a storage apparatus of a low performance such as a SAS to a storage apparatus of a high performance such as an SSD. Or more specifically, a performance can be improved by increasing the number of storage apparatuses that configure a high load LU and by improving a parallel processing. By implementing such a countermeasure, a storage region can be used in an efficient manner while a performance is maintained.

With reference to FIGS. 19 to 23, the following describes the case in which an improved configuration is proposed in order to solve a problem that has been detected.

Figure 19:
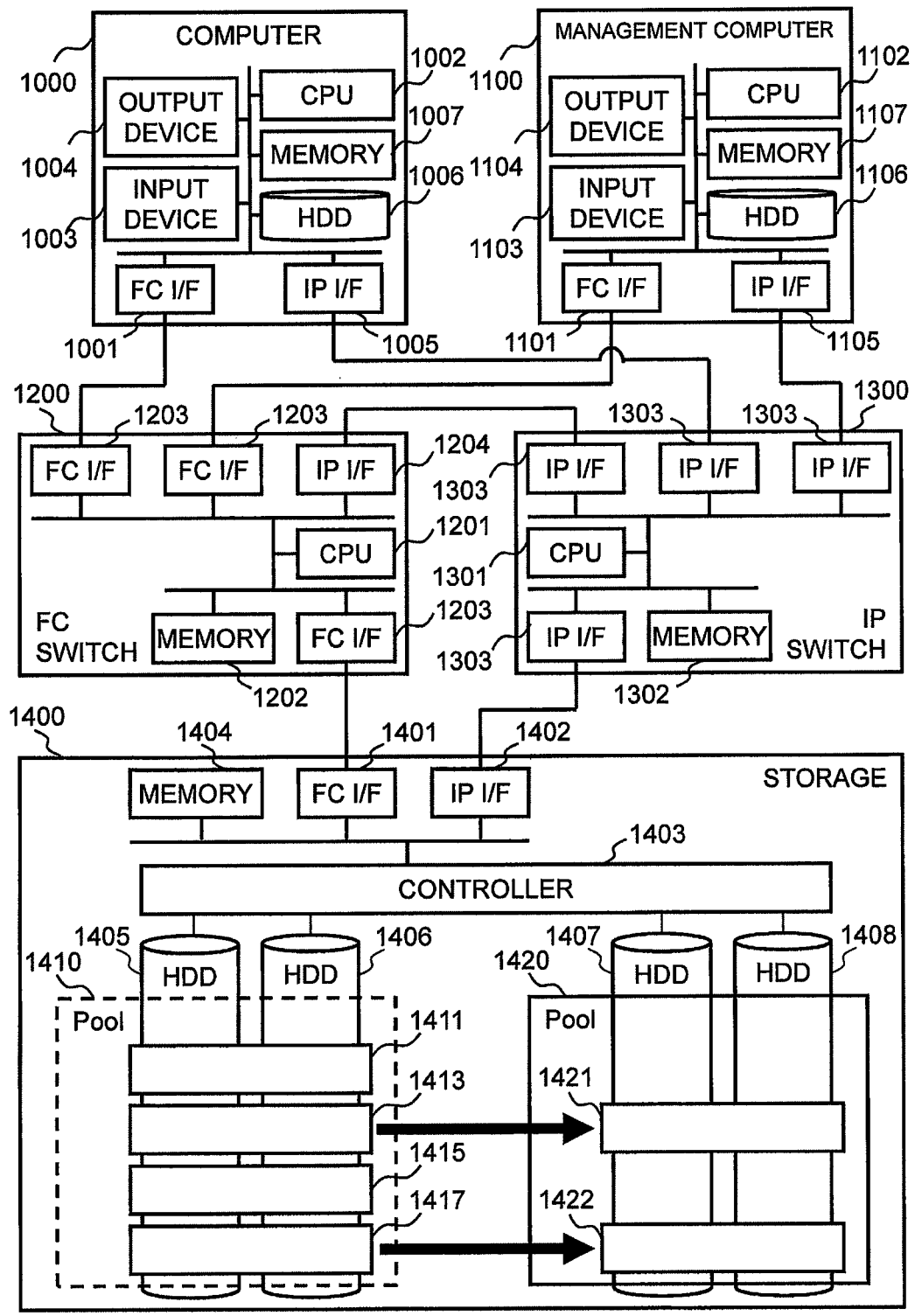
FIG. 19 is a hardware block diagram showing a computer system that includes a storage system in accordance with a second embodiment of the present invention.

FIG. 19 shows a system configuration. For the storage apparatus 1400, two thick arrows are shown from one pool 1410 to the other pool 1420. The two thick arrows indicate the state in which an LU that is a cause of a problem is moved or copied from the pool 1410 at the moment to the other pool 1420. In the present embodiment, the case in which a difference LU 1413 and a difference LU 1417 are moved or copied to the other pool 142 will be described in the following.

Figure 20:
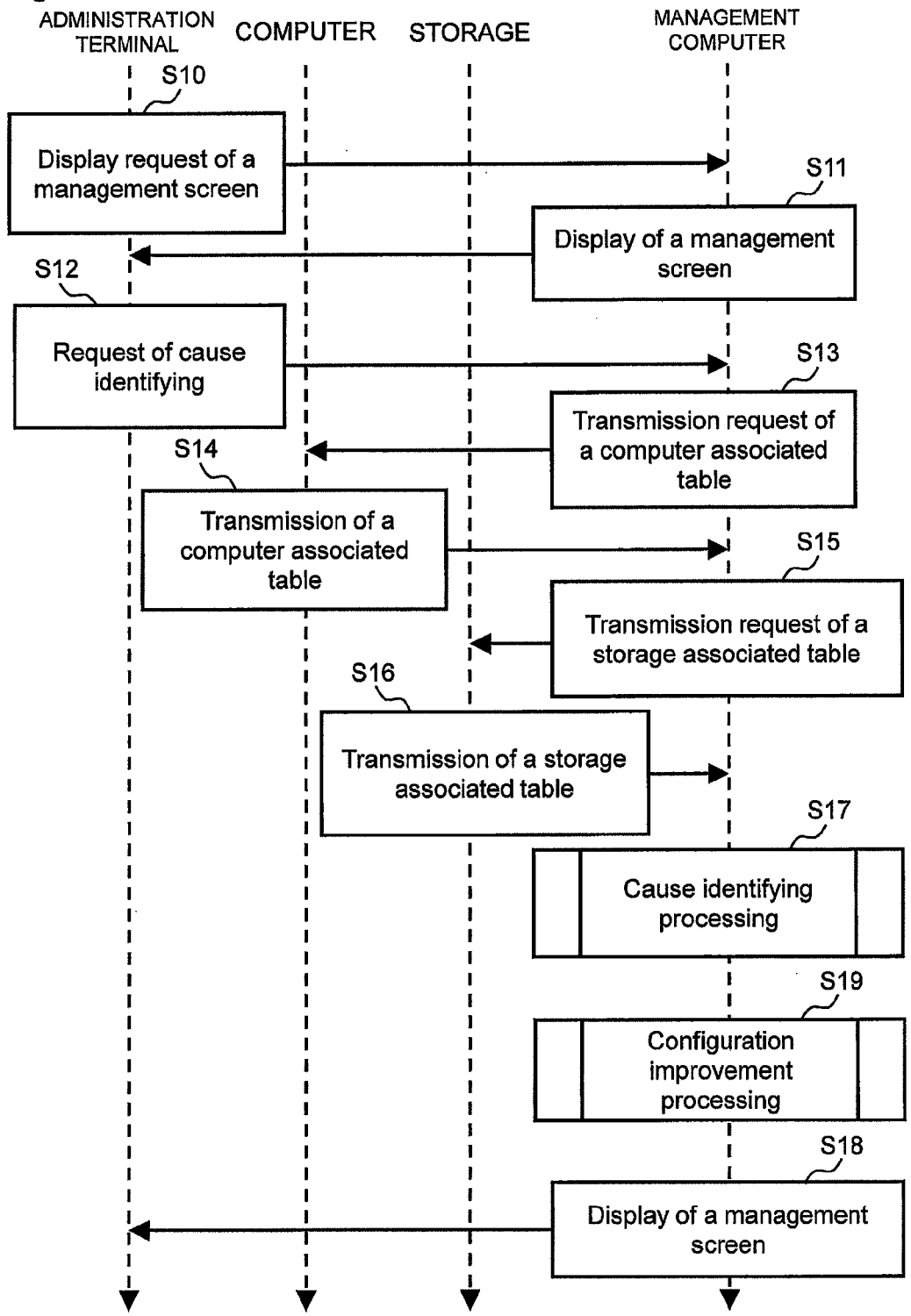
FIG. 20 is a flowchart showing an entire operation.

FIG. 20 shows a flowchart of a performance management processing in accordance with the present embodiment. The flowchart shown in FIG. 20 is provided with the steps S10 to S18 that are common with the flowchart shown in FIG. 15. Moreover, for the flowchart shown in FIG. 20, a configuration improvement processing (S19) is executed after a cause identifying processing (S17), and the execution result is displayed on the performance management screen (S18). For the configuration improvement processing, it is also possible that a configuration improvement plan is displayed on the performance management screen and the processing is executed in the case in which an approval of a user is obtained.

Figure 21:
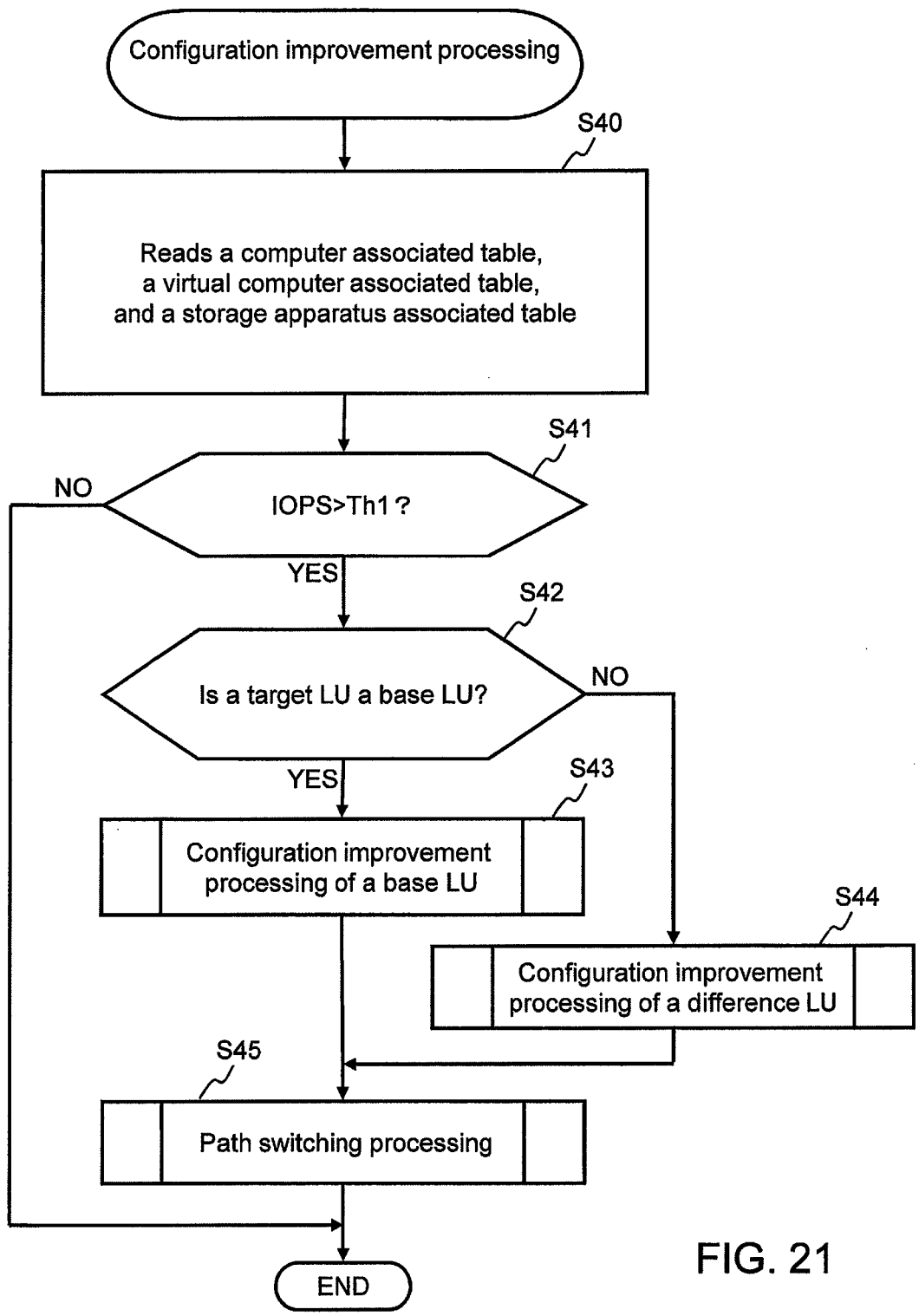
FIG. 21 is a flowchart showing a processing for creating an improved configuration as an example of a plan creation part.

FIG. 21 shows a flowchart of the configuration improvement processing. The performance management program 3001 of the management computer 1100 reads the virtual computer configuration information table 2004 of the computer 1000, the storage configuration information table 4003, the pair information table 4004, and the LU performance information table 3003 (S40).

The performance management program 3001 refers to the LU performance information table 3003 and judges whether or not an IO load (IOPS 3003C3) that is corresponded to the LU 3003C2 is larger than a threshold value Th1 (S41). The threshold value Th1 can be specified by a user or can be automatically specified by the performance management program 3001.

In the case in which a value of the TOPS of a target LU is not larger than the threshold value Th1 (S41: NO), the present processing is terminated. In the case in which a value of the IOPS of a target LU is larger than the threshold value Th1 (S41: YES), the performance management program 3001 judges whether or not the target LU is a base LU (S42).

In the case in which the target LU is a base LU (S42: YES), the performance management program 3001 executes a processing for improving a configuration of the base LU (S43) and terminates the configuration improvement processing (S45). The details of the processing for improving a configuration of the base LU will be described in FIG. 22.

In the case in which the target LU is a difference LU (the target LU is not a base LU) (S42: NO), the performance management program 3001 executes a processing for improving a configuration of the difference LU (S44) and terminates the configuration improvement processing (S45). The details of the processing for improving a configuration of the difference LU will be described in FIG. 23.

Figure 22:
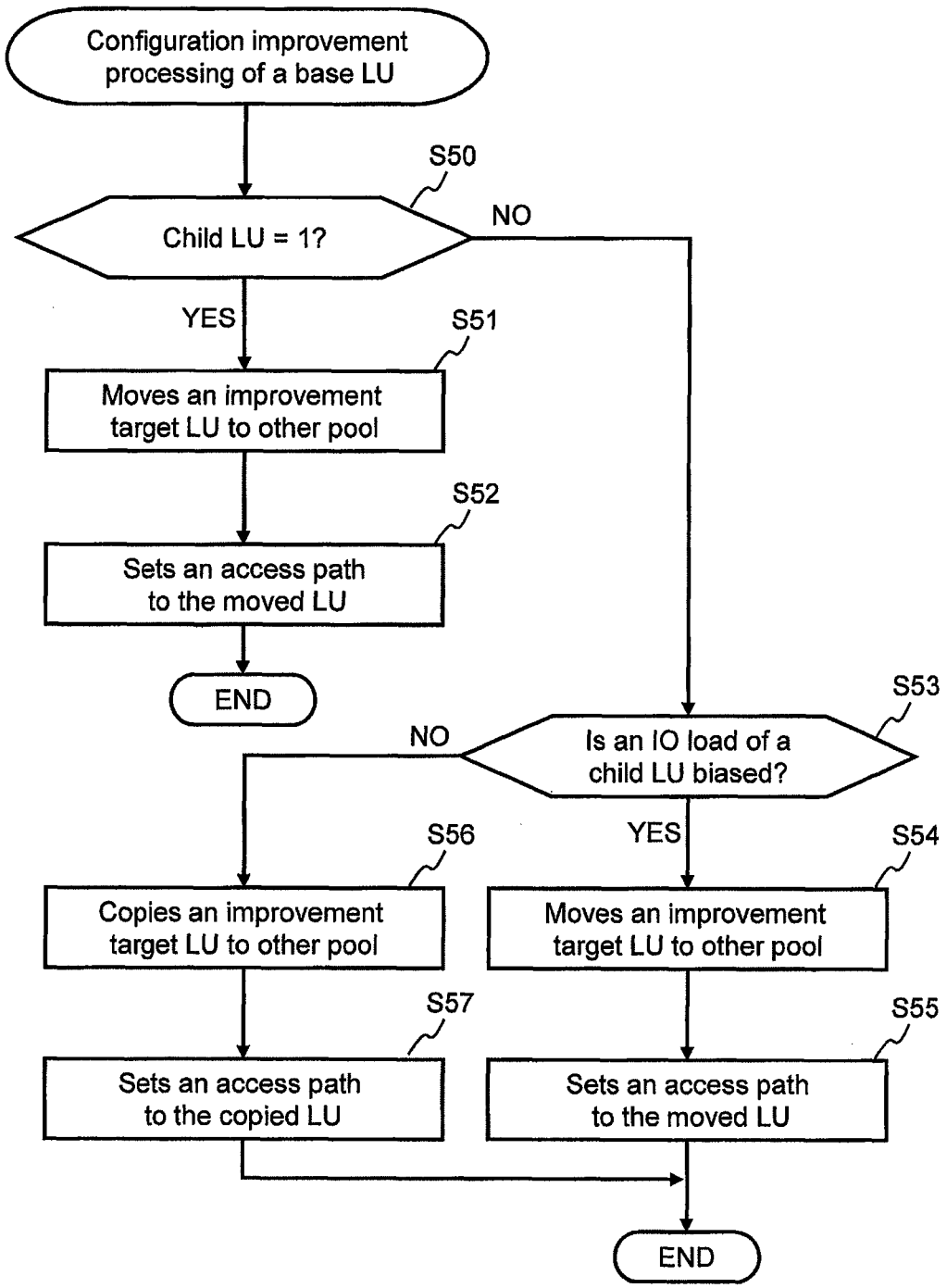
FIG. 22 is a flowchart showing a processing for improving a configuration of a base LU.

FIG. 22 is a flowchart showing a processing for improving a configuration of a base LU. The performance management program 3001 refers to the pair information table 4004 and judges whether or not an improvement target LU (a base LU) that has been judged as having a high load is provided with a single child LU (S50). A single child LU in the S50 means an LU that has been created by using an improvement target LU as a direct parent, and does not include a grandchild LU and a great grandchild LU.

In the case in which an improvement target LU of a high load is provided with a single child LU (S50: YES), the improvement target LU is moved to other pool 1420 (S51). In the next place, by updating the storage configuration information table 4003 and the pair information table 4004, an access path is set to the improvement target LU that has been moved from the child LU (S52). The descriptions of the present embodiment are based on the assumption that a movement destination pool that is provided with a sufficient processing performance is selected.

In the case in which an improvement target LU of a high load is provided with a plurality of child LUs (S50: NO), the performance management program 3001 judges whether or not the IO loads of the plurality of child LUs are biased (S53). A bias of an IO load is calculated by a standard deviation for instance.

In the case in which the IO loads of the plurality of child LUs are biased (S53: YES), the improvement target LU is moved to other pool 1420 (S54). In the next place, by updating the storage configuration information table 4003 and the pair information table 4004, an access path is set to the improvement target LU that has been moved from the child LU (S55). The descriptions of the present embodiment are based on the assumption that a movement destination pool that is provided with a sufficient processing performance is selected.

In the case in which the IO loads of the plurality of child LUs are biased, since It is not always true that a load of a child LU can be evenly dispersed even if the improvement target LU is copied to other pool 1420, a merit of the movement is larger than that of the copy. In the case of the movement, although the moved LU still has a high load, a load of a pool of a movement source is reduced due to a movement. Consequently, the movement of the improvement target LU is more excellent in the capacity efficiency due to a suppressed usage amount of a disk as compared with the case of a copy. Moreover, the movement of the improvement target LU can suppress an increase in the number of access path as compared with the case of a copy, whereby a management cost is not increased fortunately.

In the case in which the IO loads of the plurality of child LUs are not biased (S53: NO), the performance management program 3001 creates a copy of the improvement target LU in other pool 1420 (S56). In the next place, by updating the storage configuration information table 4003 and the pair information table 4004, the performance management program 3001 sets an access path to the improvement target LU that has been copied from the child LU (S57).

In this case, an access path is set in such a manner that a load of a child LU can be evenly dispersed, that is, the copied improvement target LU is accessed from the approximately half child LUs of the plurality of child LUs. As described above, in the case in which the IO loads of the plurality of child LUs are not biased, a load of a child LU can be evenly dispersed when the improvement target LU is copied to other pool 1420. Consequently, the movement of the improvement target LU has more excellent merit as compared with the case of a copy. The descriptions of the present embodiment are based on the assumption that a copy destination pool that is provided with a sufficient processing performance is selected.

In the case in which the improvement target LU is moved to other pool, it is necessary that the improvement target LU is moved to a pool that can process an IO load to the improvement target LU, that is, it is necessary that the improvement target LU is moved to a pool that is provided with a sufficient capacity for an IO load.

Consequently for instance, like the case of a movement from a pool that is configured by a SATA to a pool that is configured by an SSD, a pool that is provided with an IO processing performance higher than that of a pool at the moment is selected as a movement destination pool is some cases. It is necessary that a movement destination pool (the pool 1420 in the example of FIG. 1) is provided with a free capacity sufficient for accepting the improvement target LU of a movement target.

In the case in which the improvement target LU is copied, a usage capacity of a disk can be reduced by making the number of copies as less as possible. Consequently, a copy of the improvement target LU is disposed in a pool that is provided with a high IO processing performance.

Figure 23:
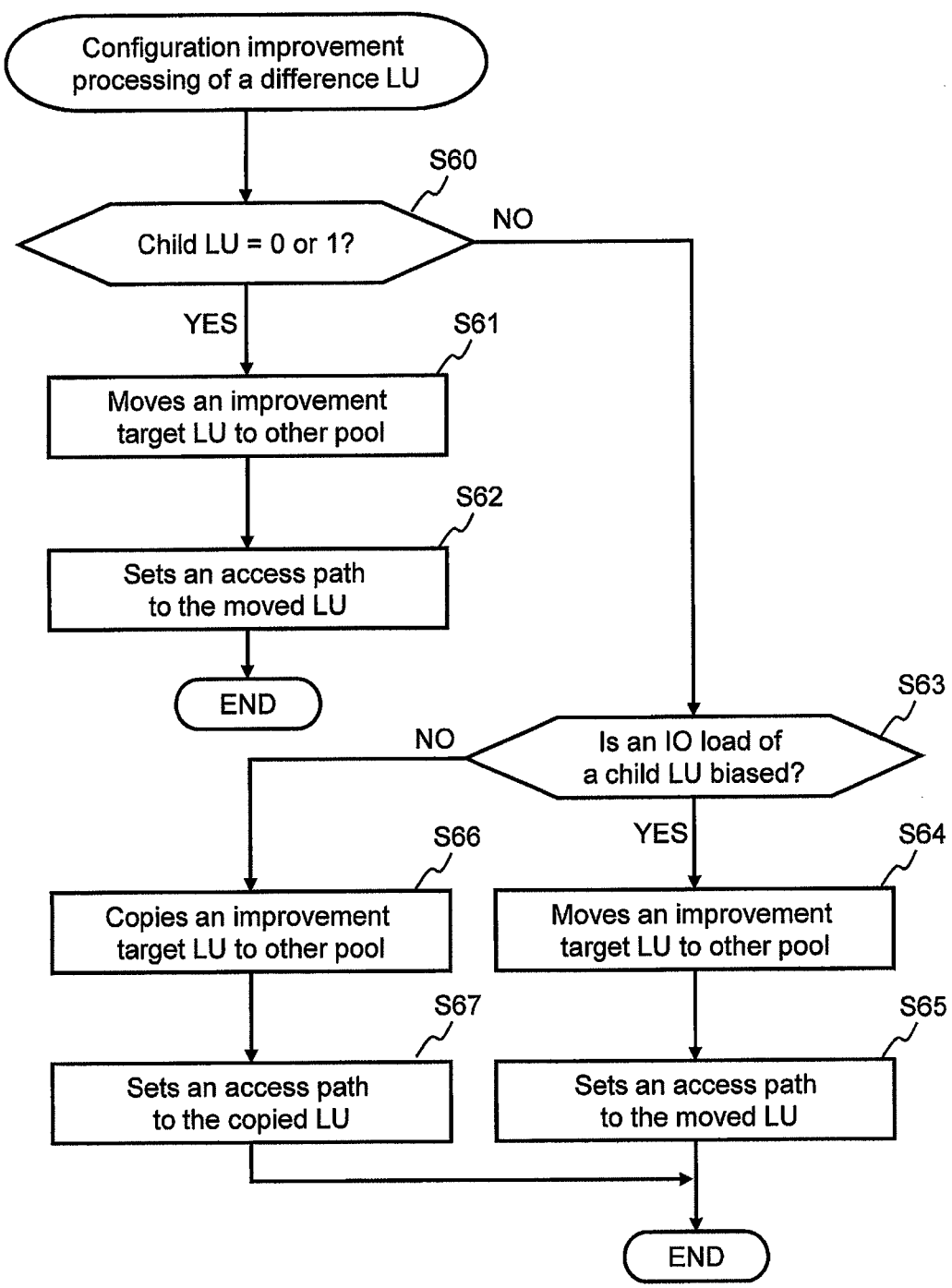
FIG. 23 is a flowchart showing a processing for improving a configuration of a difference LU.

FIG. 23 is a flowchart showing a processing for improving a configuration of a difference LU. The S60 to S67 of the present processing are corresponded to the S50 to S57 that have been described in FIG. 22. However, the S60 to S67 are different from the S50 to S57 at the points that the condition of the S60 includes the case in which a child LU is 0 (the case in which the improvement target LU is mounted to the virtual computer) and that an access path is also set from the improvement target LU that has been moved or copied to the parent LU thereof in the S62, S65, and S67. Since the other processing is equivalent to a processing of FIG. 22, the redundant descriptions are omitted.

Figure 24:
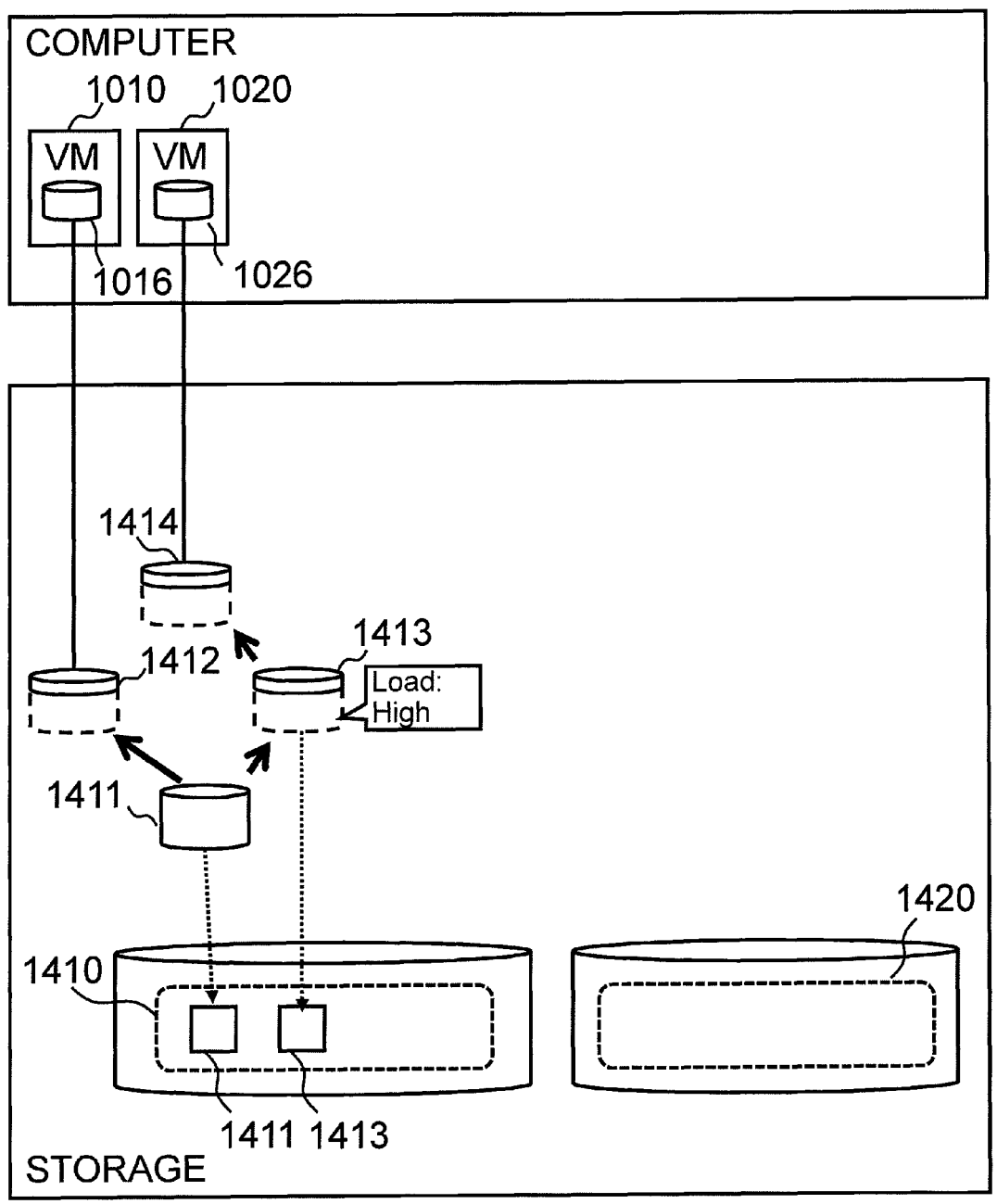
FIG. 24 is a view showing an example before improving a configuration.

With reference to FIGS. 24 to 27, the configuration modification processing will be described by using a concrete example. FIG. 24 is a view showing an example of a relationship between each of the virtual computers and each of the LUs before the configuration improvement processing, a pair configuration of each of the LUs, and the load state. In this example, the difference LU 1413 is selected as an improvement target LU that is provided with a high performance load.

Figure 25:
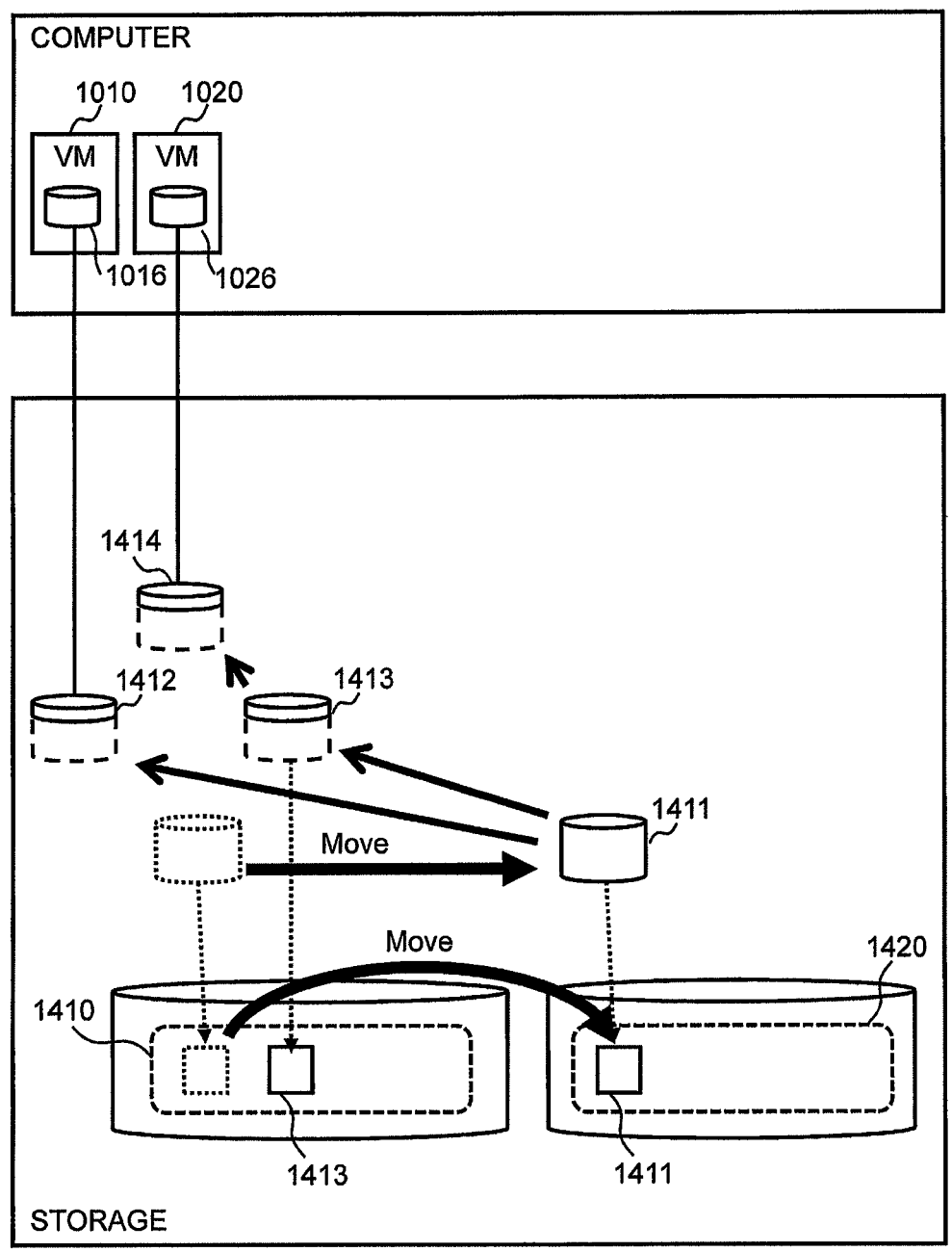
FIG. 25 is a view showing an appearance in which the configuration of FIG. 24 has been improved.

FIG. 25 is a view showing the configuration improvement processing that is executed to the state of the configuration of FIG. 24. Since the improvement target LU 1411 is provided with a plurality of child LUs 1412 and 1413 (S50: NO), the performance management program 3001 judges whether or not the IO loads of the child LUs 1412 and 1413 (S53). It is assumed that the IO loads of the child LUs 1412 and 1413 are biased in this case (S53: YES). The performance management program 3001 then moves the improvement target LU 1411 to other pool 1420 (S54). In the next place, an access path with the improvement target LU 1411 that has been moved and the child LUs 1412 and 1413 is set (S55). The descriptions of the present embodiment are based on the assumption that a movement destination pool that is provided with a sufficient processing performance is selected.

Figure 26:
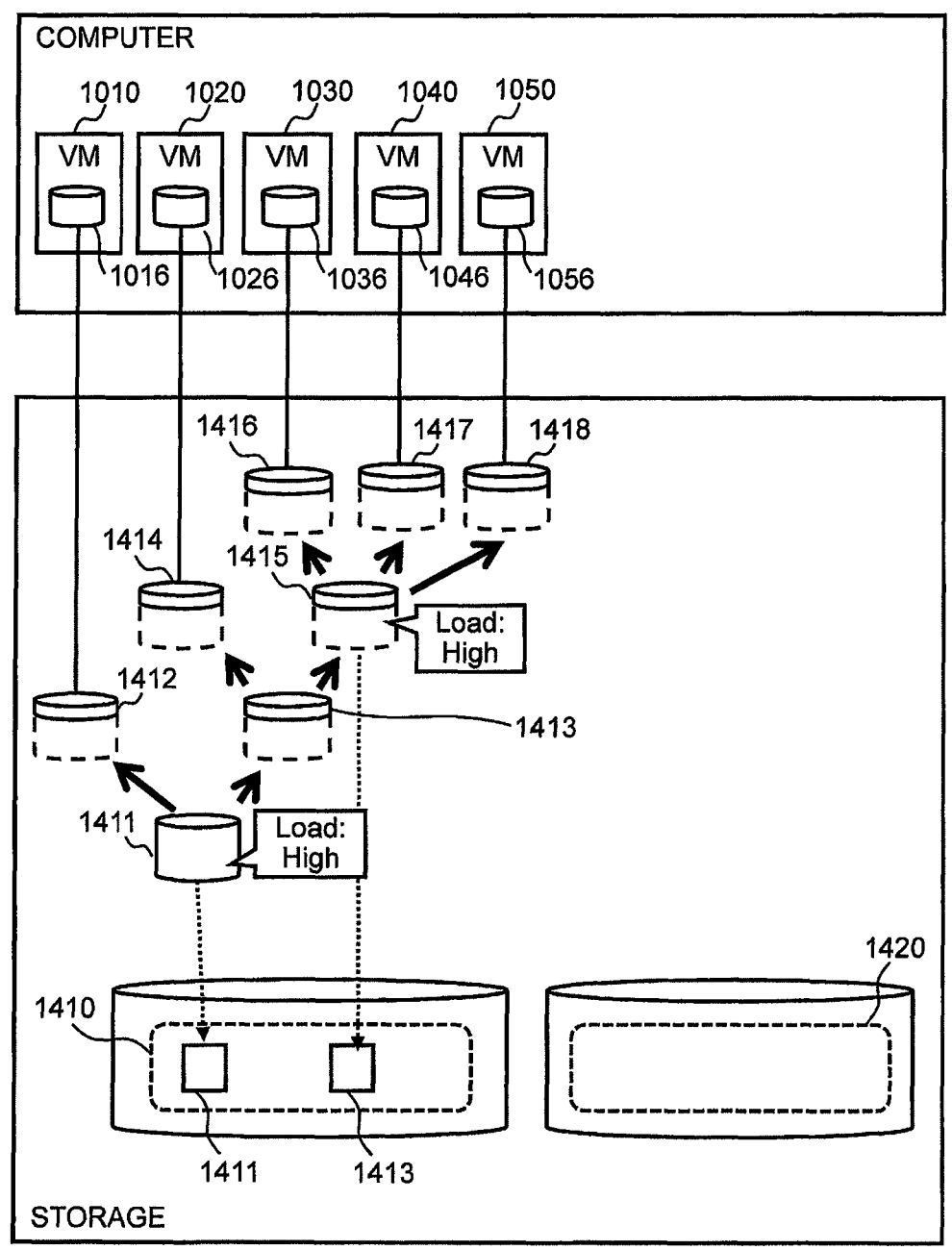
FIG. 26 is a view showing other example before improving a configuration.

FIG. 26 is a view showing an example of a relationship between each of the virtual computers and each of the LUs before the configuration improvement processing, a pair configuration of each of the LUs, and the load state. In this example, the base LU 1411 and the difference LU 1415 are selected as an improvement target LU that is provided with a high performance load.

Figure 27:
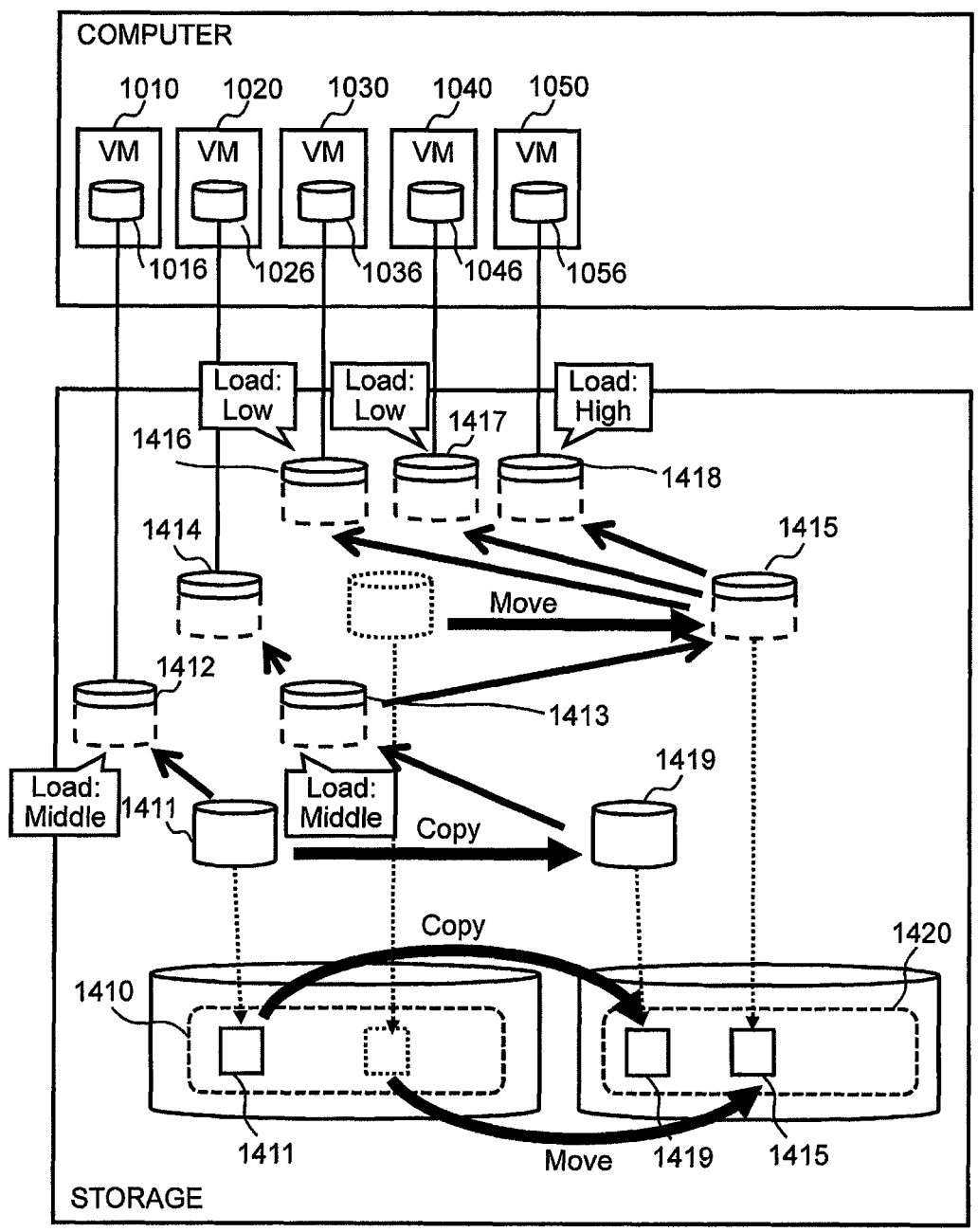
FIG. 27 is a view showing an appearance in which the configuration of FIG. 26 has been improved.

FIG. 27 is a view showing the configuration improvement processing that is executed to the state of the configuration of FIG. 26. Since the loads of the child LUs 1412 and 1413 of the improvement target LU 1411 is equal to each other (S53: NO), the performance management program 3001 copies the improvement target LU 1411 to other pool 1420 (S56), and an access path between the improvement target LU 1419 that has been copied and the child LU 1413 is set (S57). In the present embodiment, since the improvement target LU 1411 is provided with the two child LUs 1412 and 1413 of which loads are equal to each other, one of the child LUs 1412 and 1413 can be coupled to the improvement target LU 1419 that has been copied. The descriptions of the present embodiment are based on the assumption that a copy destination pool that is provided with a sufficient processing performance is selected.

The other improvement target LU 1415 is examined. Since a load of the child LU 1416, a load of the child LU 1417, and a load of the child LU 1418 are not equal to each other, the performance management program 3001 moves the improvement target LU 1415 to other pool 1420 (S64). In the next place, the performance management program 3001 sets an access path from the moved improvement target LU 1415 to the parent LU 1413 and an access path between the child LU 1416, the child LU 1417, and the child LU 1418 and the improvement target LU 1415 that has been moved (S65). The descriptions of the present embodiment are based on the assumption that a movement destination pool that is provided with a sufficient processing performance is selected.

When the above described configurations are summarized, the methods for improving a configuration of a volume group can be classified into the following six types for instance.

(M1) Case in which a base LU is a cause LU and a single child LU is included In the case of M1, the base LU is moved to other pool, and an access path between the base LU that has been moved and the child LU is set.

(M2) Case in which a base LU is a cause LU, a plurality of child LUs is included, and the IO loads of the plurality of child LUs are biased
In the case of M2, the base LU is moved to other pool, and an access path from the child LU to the base LU that has been moved is set.

(M3) Case in which a base LU is a cause LU, a plurality of child LUs is included, and the IO loads of the plurality of child LUs are not biased
In the case of M3, a copy of the base LU is created in other pool, and an access path is set in such a manner that an IO load of the base LU of a copy source and an IO load of the base LU of a copy destination are almost equal to each other. For instance, by setting an access path from a half of child LUs to the base LU that has been copied, one computer (virtual computer) accesses the base LU of a copy source and the other computer (virtual computer) accesses the base LU of a copy destination, whereby the loads can be dispersed.

(M4) Case in which a difference LU is a cause LU, and a single child LU is included In the case of M4, the difference LU is moved to other pool, and an access path from the child LU to the difference LU that has been moved and an access path from the moved difference LU to the parent LU are set.

(M5) Case in which a base LU is a cause LU, a plurality of child LUs is included, and the IO loads of the plurality of child LUs are biased
In the case of M5, an access path from the child LU to the difference LU that has been moved and an access path from the moved difference LU to the parent LU are set.

(M6) Case in which a difference LU is a cause LU, a plurality of child LUs is included, and the IO loads of the plurality of child LUs are not biased
In the case of M6, a copy of the difference LU is created in other pool, and an access path is set in such a manner that an IO load of the difference LU of a copy source and an IO load of the difference LU of a copy destination are almost equal to each other.

In the present embodiment, an LU that is a cause of a problem is moved or copied to other pool, and an access path of the computer (virtual computer) is set again. By this configuration, a performance bottleneck can be resolved, and a response performance of a storage apparatus can be maintained.

While the preferred embodiments in accordance with the present invention have been described above, the present invention is not restricted to the embodiments. A person having ordinary skill in the art can carry out various changes, modifications, and functional additions without departing from the scope of the present invention. For instance, the case in which an LU is allocated to a virtual computer was described in each of the embodiments. As substitute for this configuration, a configuration in which an LU is allocated to a physical computer can also be adopted.

Moreover, a function of a management computer can also be embedded into any one of a computer, a switch, and a storage apparatus.

The invention claimed is:
1. A storage system comprising a storage apparatus and a management apparatus, the storage apparatus comprising: a volume group including a plurality of logical volumes, the logical volumes including one or more first logical volumes to store reference data and a second logical volume to store difference data from the one or more first logical volumes, the second logical volume allocated to a computer; and
  a controller,
    wherein the controller, on receipt of an I/O request to the second logical volume from the computer,
    accesses the difference data in the second logical volume if an access destination of the I/O request is the difference data,
    accesses the reference data in the one or more first logical volumes if an access destination of the access request is the reference data, and
    measures the number of I/O requests to each of the one or more first logical volumes and the second logical volume;
  the management apparatus:
  identifies a high load volume according to the number of the I/O requests measured by the controller and
  judges whether a cause logical unit is a base logical unit or a difference logical unit, and performs a process of improvement of configuration of loads according to a load state;
  a storage pool for providing the logical volumes; and
  a memory for storing mapping information between logical addresses of each of the logical volumes and addresses of the storage pool;

wherein the controller accesses each of the logical volumes in the volume group according to the mapping information;

wherein the logical volumes comprising a base volume, one or more reference volumes each of which is a snapshot volume of the base volume, and one or more snapshot volumes of the one or more reference volumes;

wherein the management apparatus identifies a logical volume whose load is higher than a predetermined value as the high load volume; and a configuration of the volume group being classified into the following:

on a first condition that the base logical unit is the cause logical unit and a single child logical unit is included, the base logical unit is moved to another pool, and a first access path between the base logical unit that has been moved and the single child logical unit is set;

on a second condition that the base logical unit is the cause logical unit, a plurality of child logical units is included, and I/O loads of the plurality of child logical units are biased, the base logical unit is moved to the another pool, and a second access path from one of the plurality of child logical units to the base logical unit that has been moved is set;

on a third condition that the base logical unit is the cause logical unit, the plurality of child logical units is included, and the I/O loads of the plurality of child logical units are not biased, a copy of the base logical unit is created in the another pool, and a third access path is set in such a manner that an I/O load of the base logical unit of a copy source and an I/O load of the base logical unit of a copy destination are about equal to each other;

on a fourth condition that the difference logical unit is the cause logical unit, and the single child logical unit is included, the difference logical unit is moved to the another pool, and a fourth access path from the single child logical unit to the difference logical unit that has been moved and a fifth access path from the moved difference logical unit to a parent logical unit are set;

on a fifth condition that the base logical unit is the cause logical unit, the plurality of child logical units is included, and the I/O loads of the plurality of child logical units are biased, a sixth access path from the child logical unit to the difference logical unit that has been moved and a seventh access path from the moved difference logical unit to the parent logical unit are set; and on a sixth condition that the difference logical unit is the cause logical unit, the plurality of child logical units is included, and the I/O loads of the plurality of child logical units are not biased, a copy of the difference logical unit is created in the another pool, and an eighth access path is set in such a manner that an I/O load of the difference logical unit of the a copy source and an I/O load of the difference logical unit of the copy destination are about equal to each other.

2. A storage system according to claim 1, wherein the management apparatus copies or moves the high load volume to another storage pool.

3. A storage system according to claim 2, wherein a response performance of another storage pool is higher than that of the storage pool.

4. A storage system according to claim 2, wherein if a plurality of computers accesses the high load volume, the management apparatus allocates I/O requests from some computers of the computers to a copied volume of the high load volume.

5. A method of managing a performance of a storage system comprising a volume group that includes a plurality of logical volumes, the logical volumes including one or more first logical volumes to store reference data and a second logical volume to store difference data from the one or more first logical volumes, the second logical volume allocated to a computer;

the method comprising the steps of:

receiving an I/O request to the second logical volume from the computer, accessing the difference data in the second logical volume if an access destination of the I/O request is the difference data, accessing the reference data in the one or more first logical volumes if an access destination of the access request is the reference data, measuring the number of I/O requests to each of the one or more first logical volumes and the second logical volume;

identifying a high load volume according to the number of the I/O requests measured by a controller, judging whether a cause logical unit is a base logical unit or a difference logical unit, and performing a process of improvement of configuration of loads according to a load state;

a storage pool for providing the logical volumes; and a memory for storing mapping information between logical addresses of each of the logical volumes and addresses of the storage pool;

wherein the controller accesses each of the logical volumes in the volume group according to the mapping information;

wherein the logical volumes comprising a base volume, one or more reference volumes each of which is a snapshot volume of the base volume, and one or more snapshot volumes of the one or more reference volumes;

wherein the management apparatus identifies a logical volume whose load is higher than a predetermined value as the high load volume; and configuring of the volume group being classified into the following classifications:

on a first condition that the base logical unit is the cause logical unit and a single child logical unit is included, the base logical unit is moved to another pool, and a first access path between the base logical unit that has been moved and the single child logical unit is set;

on a second condition that the base logical unit is the cause logical unit, a plurality of child logical units is included, and I/O loads of the plurality of child logical units are biased, the base logical unit is moved to the another pool, and a second access path from one of the plurality of child logical units to the base logical unit that has been moved is set;

on a third condition that the base logical unit is the cause logical unit, the plurality of child logical units is included, and the I/O loads of the plurality of child logical units are not biased, a copy of the base logical unit is created in the another pool, and a third access path is set in such a manner that an I/O load of the base logical unit of a copy source and an I/O load of the base logical unit of a copy destination are about equal to each other;

on a fourth condition that the difference logical unit is the cause logical unit, and the single child logical unit is included, the difference logical unit is moved to the another pool, and a fourth access path from the single child logical unit to the difference logical unit that has been moved and a fifth access path from the moved difference logical unit to a parent logical unit are set;

on a fifth condition that the base logical unit is the cause logical unit, the plurality of child logical units is included, and the I/O loads of the plurality of child logical units are biased, a sixth access path from the child logical unit to the difference logical unit that has been moved and a seventh access path from the moved difference logical unit to the parent logical unit are set; and on a sixth condition that the difference logical unit is the cause logical unit, the plurality of child logical units is included, and the I/O loads of the plurality of child logical units are not biased, a copy of the difference logical unit is created in the another pool, and an eighth access path is set in such a manner that an I/O load of the difference logical unit of the a copy source and an I/O load of the difference logical unit of the copy destination are about equal to each other.

6. A method for managing a performance of a storage system according to claim 5, the method further comprising a step of copying or moving the high load volume from the storage pool providing the logical volumes to a different storage pool.

* * * * *